Jan. 12, 1932.　　　B. M. SHIPLEY　　　1,840,639
CASH REGISTER
Filed July 24, 1922　　　12 Sheets-Sheet 1

Inventor
Bernis M. Shipley
By Earl Beust
and Henry E. Stauffer
His Attorneys

Jan. 12, 1932.    B. M. SHIPLEY    1,840,639
CASH REGISTER
Filed July 24, 1922    12 Sheets-Sheet 2
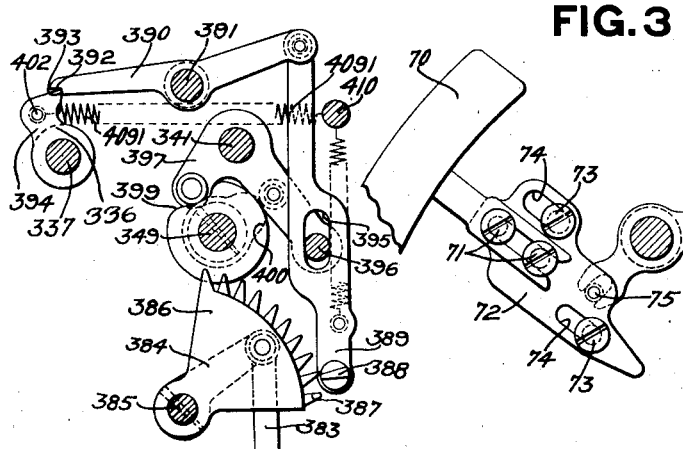
FIG.2
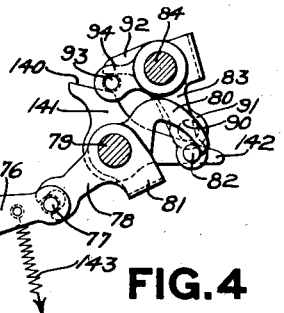
FIG.3
FIG.4
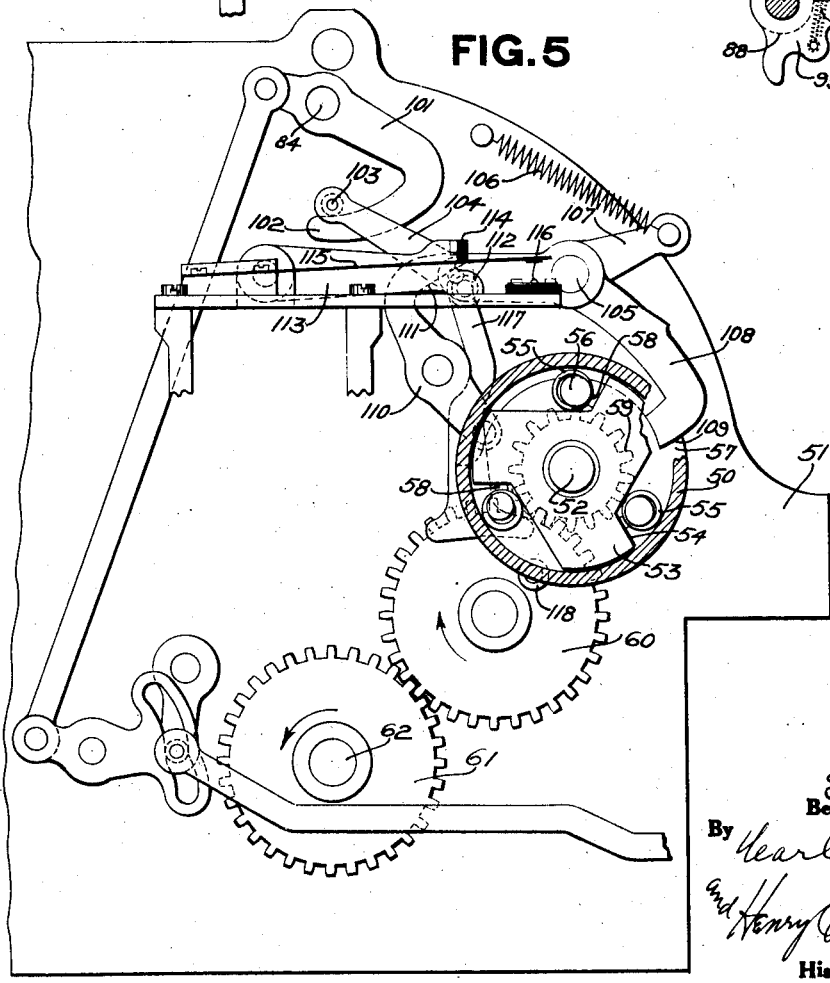
FIG.5
Inventor
Bernis M. Shipley
By Pearl Beust
and Henry E. Stauffer
His Attorneys Jan. 12, 1932.　　　B. M. SHIPLEY　　　1,840,639
CASH REGISTER
Filed July 24, 1922　　12 Sheets-Sheet 3
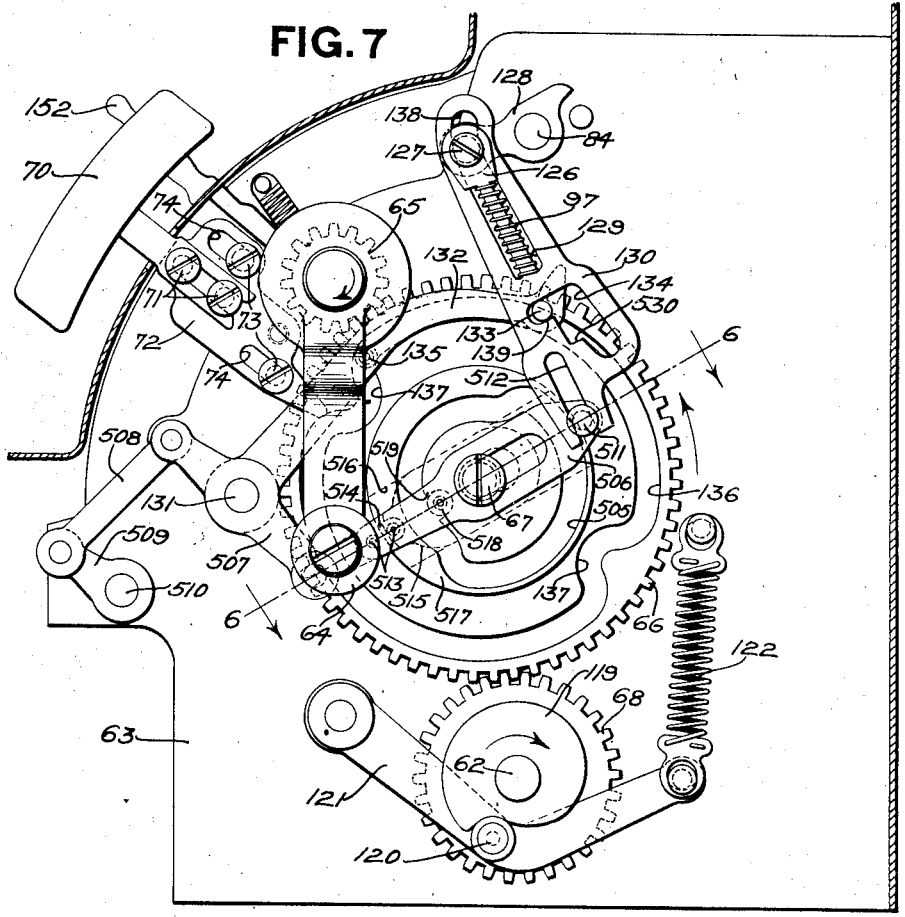

Jan. 12, 1932.  B. M. SHIPLEY  1,840,639
CASH REGISTER
Filed July 24, 1922  12 Sheets-Sheet 4

Inventor
Bernis M. Shipley
By Carl Beust
and Henry C. Stauffer
His Attorneys

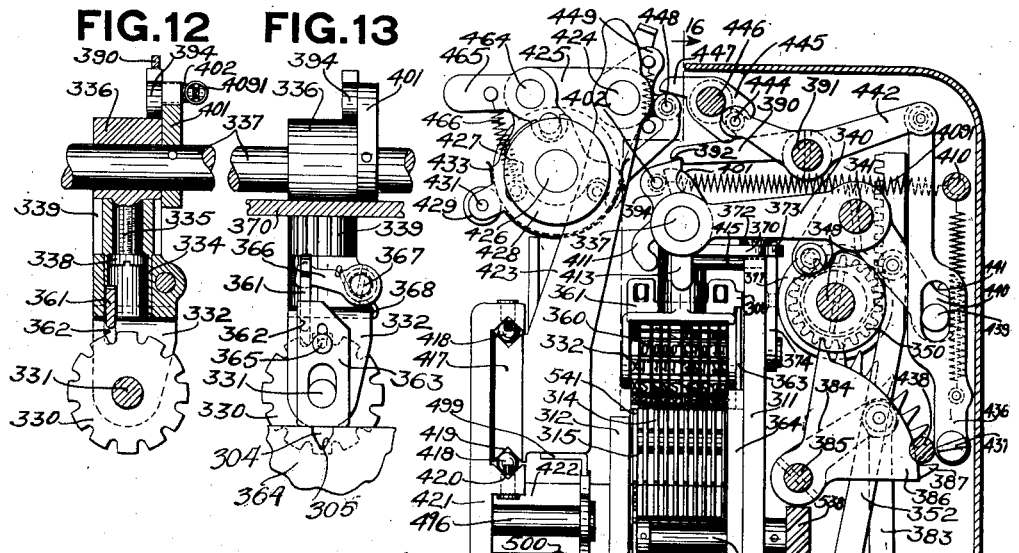
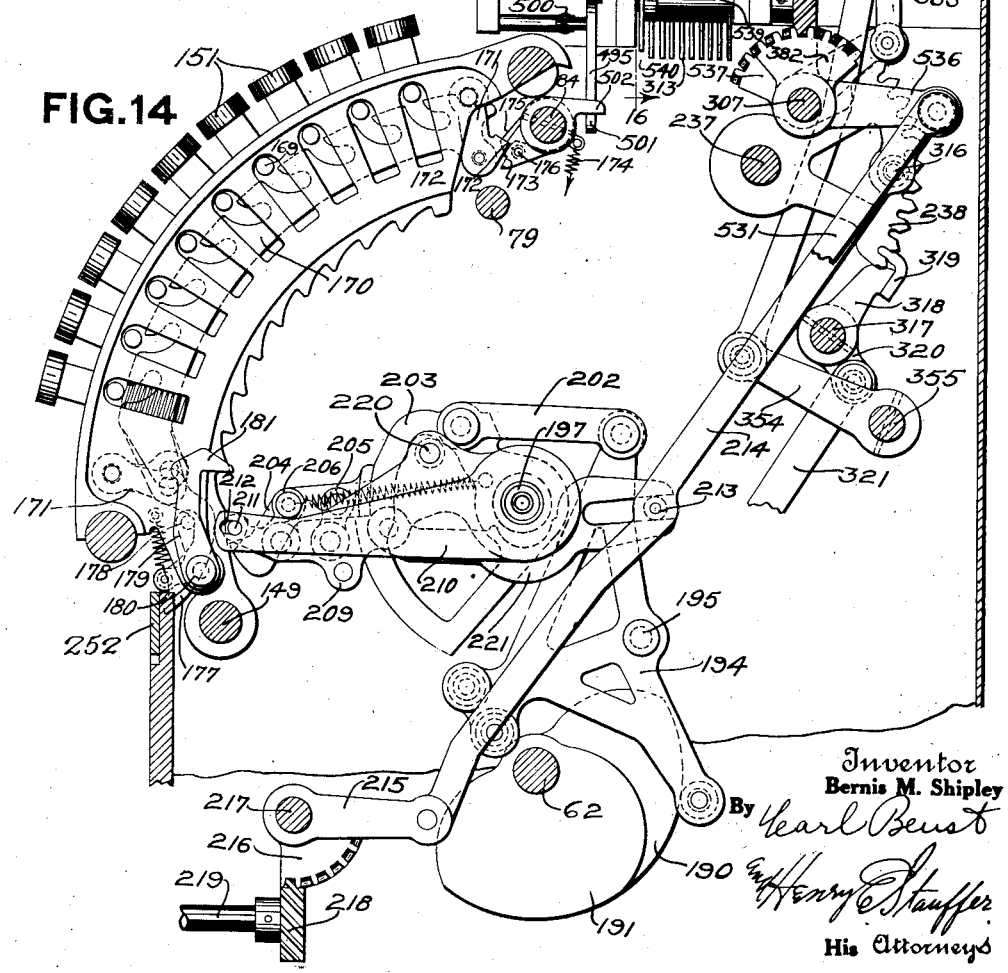

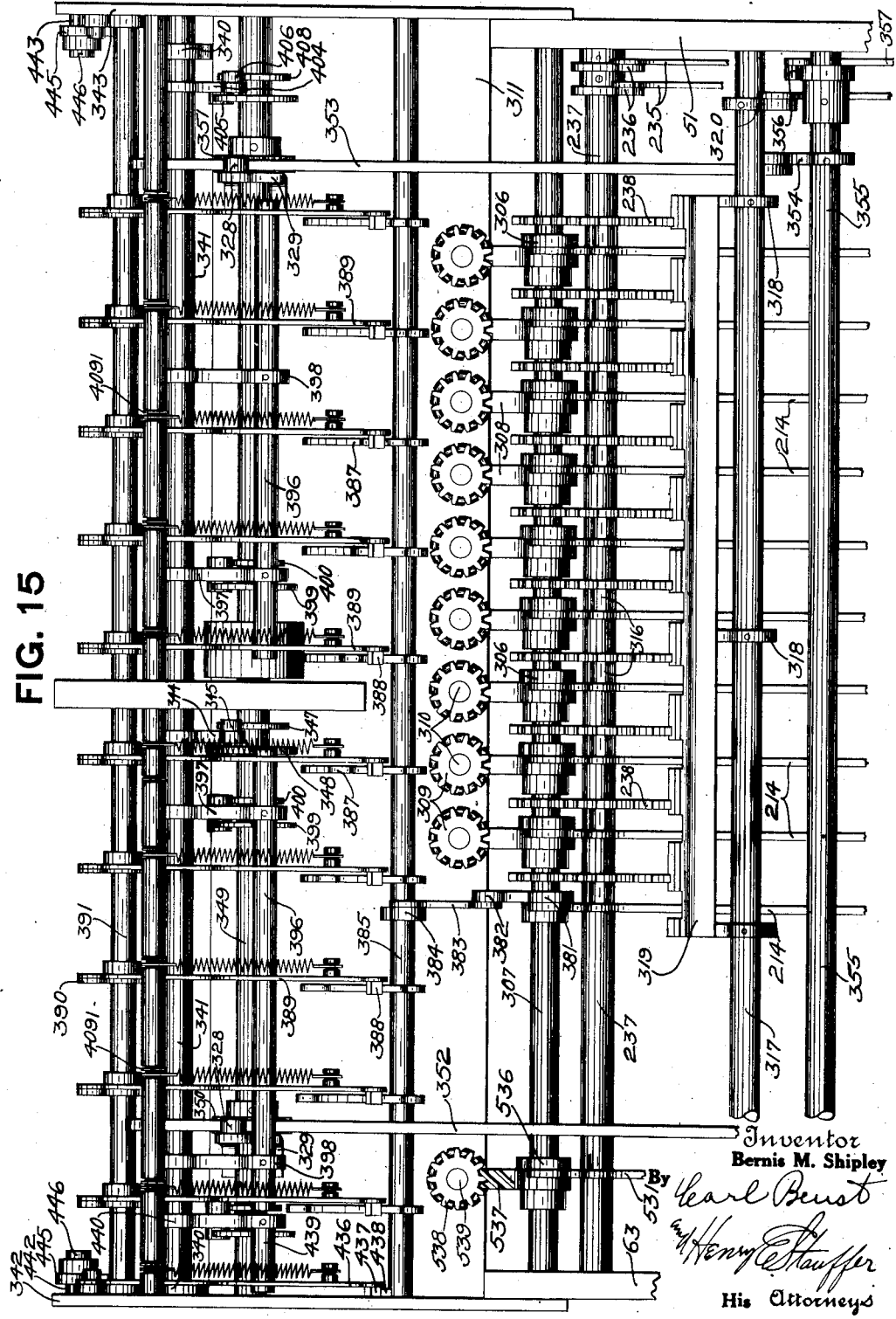

Jan. 12, 1932.  B. M. SHIPLEY  1,840,639
CASH REGISTER
Filed July 24, 1922   12 Sheets-Sheet 7
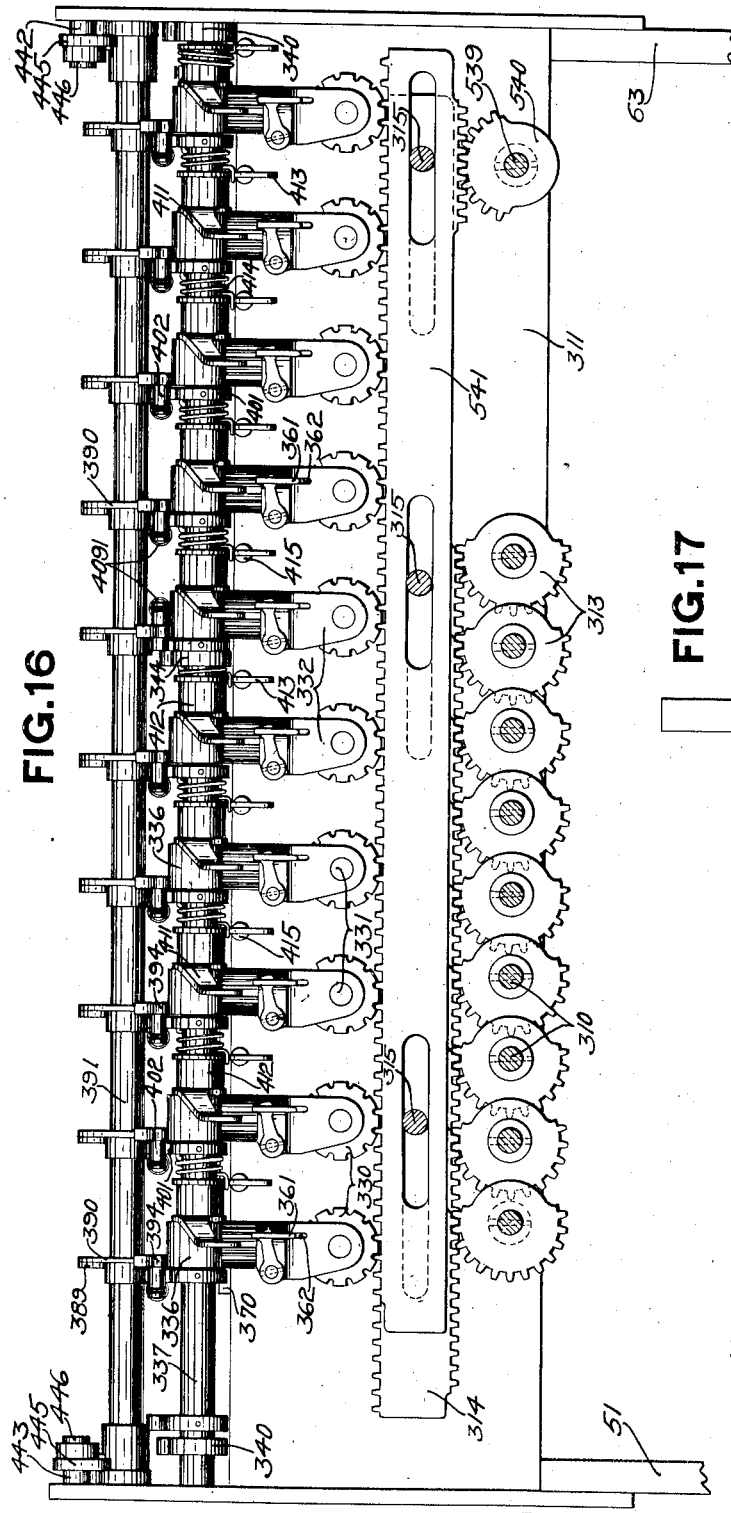
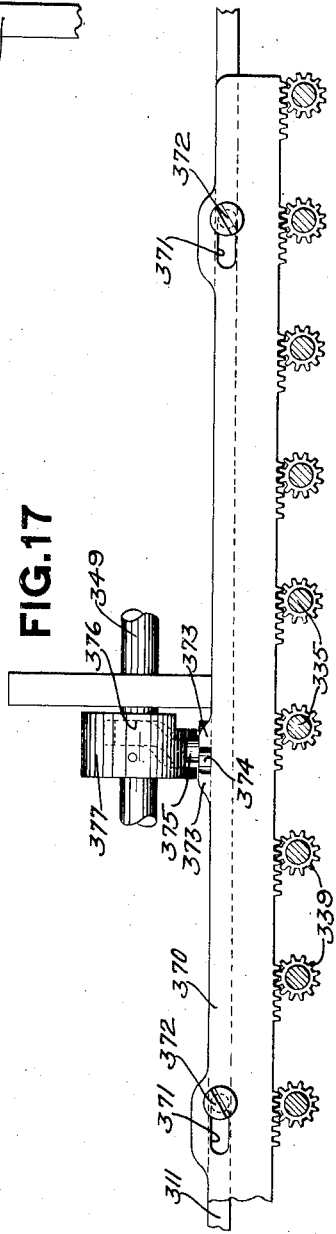
Inventor
Bernis M. Shipley
By Earl Beust
and Henry E Stauffer
His Attorneys Jan. 12, 1932.                B. M. SHIPLEY                1,840,639
                              CASH REGISTER
                         Filed July 24, 1922      12 Sheets-Sheet 8
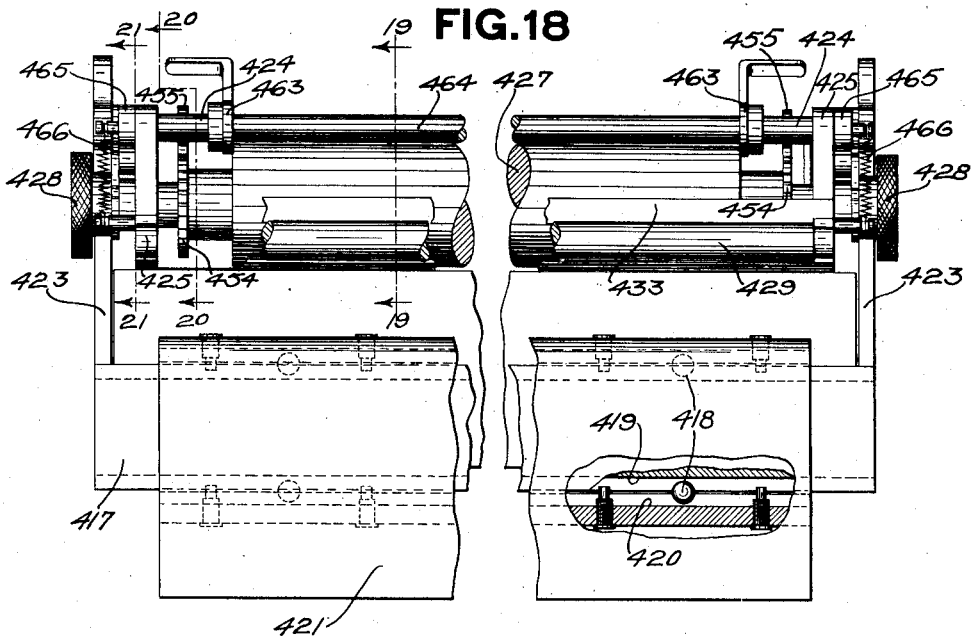
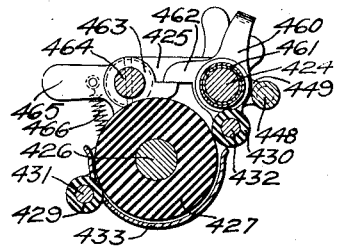
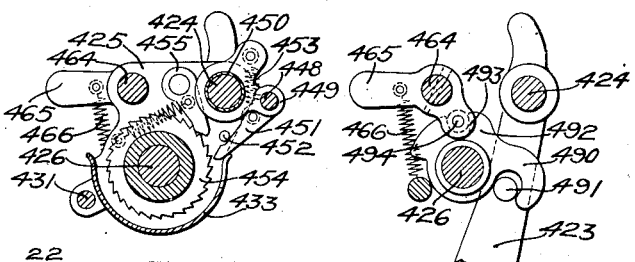
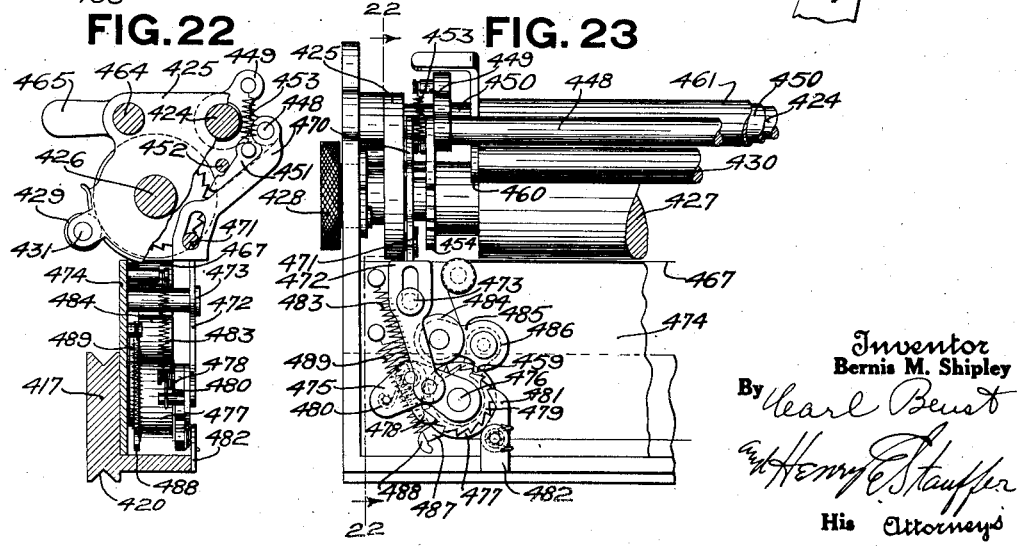
Inventor
Bernis M. Shipley
By Carl Beust
and Henry C. Stauffer
His Attorneys

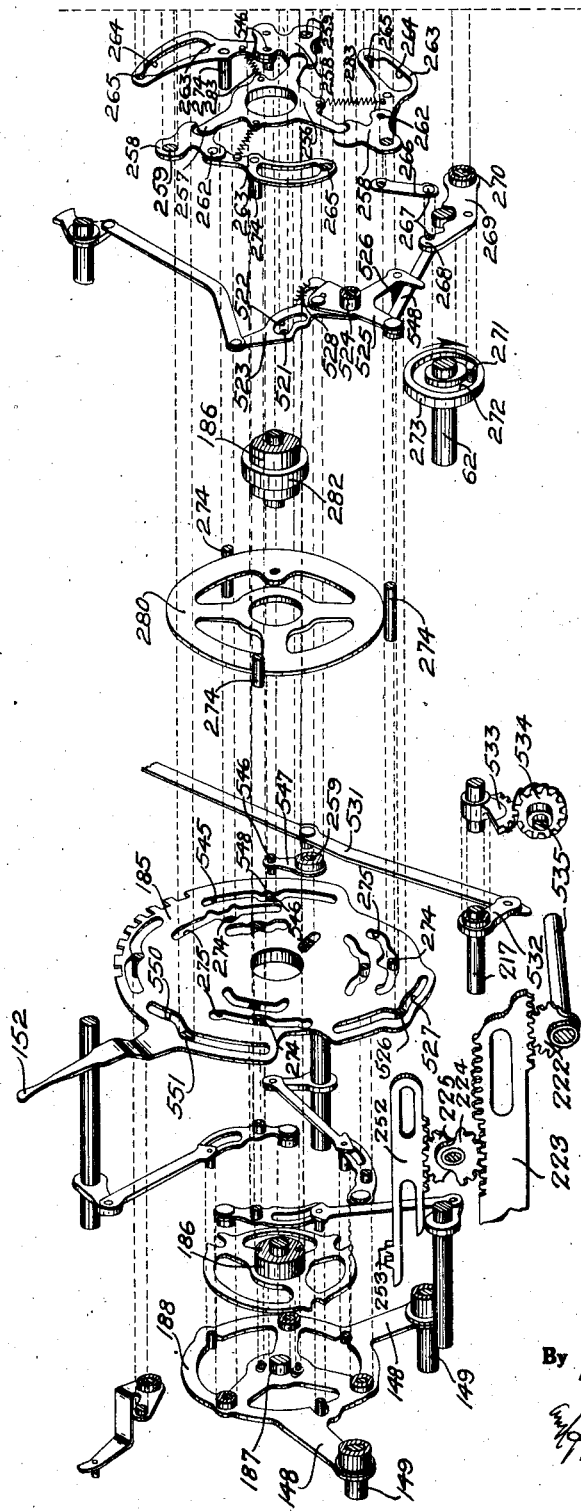

Jan. 12, 1932.　　B. M. SHIPLEY　　1,840,639
CASH REGISTER
Filed July 24, 1922　　12 Sheets-Sheet 10

Inventor
Bernis M. Shipley
By
His Attorneys

Jan. 12, 1932.  B. M. SHIPLEY  1,840,639
CASH REGISTER
Filed July 24, 1922  12 Sheets-Sheet 11
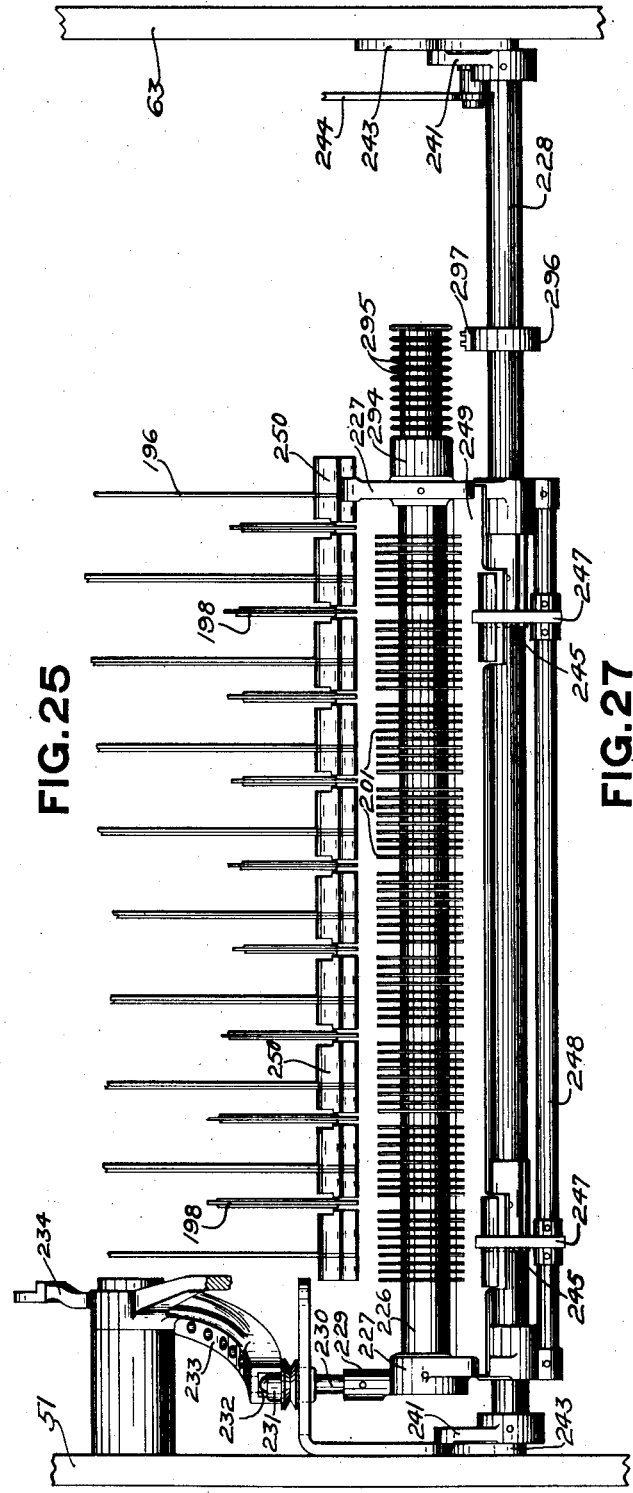
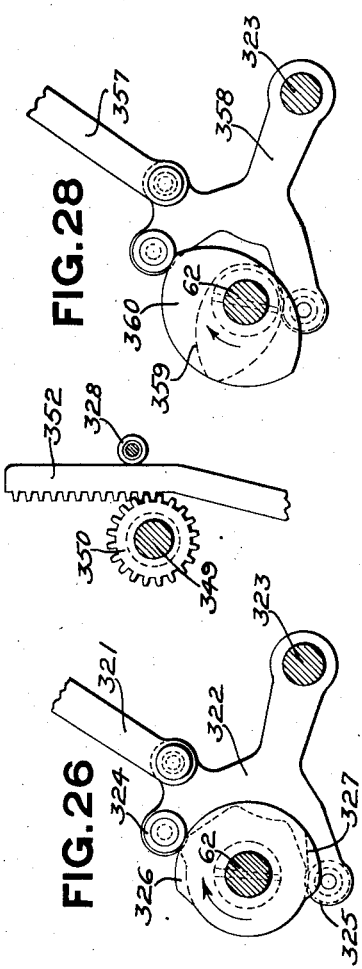
Inventor
Bernis M. Shipley
By
His Attorneys Jan. 12, 1932.                B. M. SHIPLEY                1,840,639
                                CASH REGISTER
                            Filed July 24, 1922           12 Sheets-Sheet 12

FIG. 29

THE DOE BANK

| CASH | FOREIGN CHECKS | CITY CHECKS | CHECKS ON US | P. O. MONEY ORDER | EXPRESS MONEY ORDER | DEPOSITS | CLEARING HOUSE | COUPONS | GRAND TOTAL |
|---|---|---|---|---|---|---|---|---|---|
| X 10,381.00 | X 137,621.45 | X 3,645.09 | X 675,498.91 | X 5,240.00 | X 1,867.29 | X 2,468.54 | X 9,378.10 | X 461.27 | X 851,532.65 |
| 35.45 | 30.00 | 45.00 | 60.00 | 34.30 | 33.00 | 34.54 | 46.00 | 823.46 | |
| 40.00 | 23.00 | 130.00 | 5.00 | 45.00 | 55.50 | 45.00 | 35.00 | 27.63 | |
| 35.55 | 33.00 | 24.00 | 34.00 | 35.00 | 55.50 | 44.50 | 24.00 | 9.80 | |
| 60.50 | 60.50 | 43.00 | 70.00 | 40.00 | 44.40 | 53.50 | 200.00 | 4,256.00 | |
| 65.66 | 36.00 | 35.00 | 53.30 | 35.00 | 44.40 | 4.00 | 50.00 | 39.30 | |
| 35.00 | 20.50 | 46.00 | 25.00 | | 55.00 | 56.60 | 60.00 | 110.00 | |
| 46.00 | 60.60 | 132.00 | 240.00 | | | 34.30 | 400.00 | 11.11 | |
| 35.00 | 05.50 | 24.00 | 43.40 | | | 45.00 | 200.00 | 5.00 | |
| 144.00 | 34.44 | 4.00 | 64.00 | | | | 300.00 | 34.96 | |
| 53.50 | | 5.00 | 45.54 | | | | 350.00 | | |
| 2,440.00 | | | 24.44 | | | | 150.00 | | |
| 54.00 | 50.00 | | 46.66 | | | | 40.00 | | |
| 45.00 | 2.50 | 33.44 | 35.00 | | | | 25.00 | | |
| 350.00 | 17.00 | 44.30 | 3.00 | | | | 350.00 | | |
| 35.00 | 25.00 | 55.40 | 354.40 | | | | 400.00 | | |
| 45.00 | 16.75 | 50.00 | 36.05 | | | | 600.00 | | |
| 450.00 | 14.50 | | 4,350.40 | | | | | | |
| | 13.75 | | 5.50 | | | | | | |
| | 4.56 | | 65.40 | | | | | | |
| | 23.40 | | 35.05 | | | | | | |
| | 47.00 | | 55.00 | | | | | | |
| | 19.50 | | 23.00 | | | | | | |
| | | | 46.65 | | | | | | |
| | 33.00 | | 43.20 | | | | | | |
| | 140.00 | | 26.00 | | | | | | |
| | 205.00 | | 16.00 | | | | | | |
| | 77.00 | | 50.50 | | | | | | |
| | 0.44 | | 5.00 | | | | | | |
| | 2,440.00 | | 7.00 | | | | | | |
| | 35.50 | | 33.00 | | | | | | |
| | | | 10.00 | | | | | | |
| | | | 15.00 | | | | | | |
| | | | 25.00 | | | | | | |
| | | | 70.00 | | | | | | |
| | | | 300.00 | | | | | | |
| | | | 150.00 | | | | | | |
| | | | 105.00 | | | | | | |
| | | | 475.00 | | | | | | |
| | | | 305.00 | | | | | | |
| | | | 50.50 | | | | | | |
| | | | 3.00 | | | | | | |
| | | | 0.70 | | | | | | |
| | | | 35.50 | | | | | | |
| | | | 55.50 | | | | | | |
| | | | 44.00 | | | | | | |
| | | | 56.00 | | | | | | |
| | | | 65.00 | | | | | | |
| | | | 57.00 | | | | | | |
| | | | 34.80 | | | | | | |
| | | | 43.30 | | | | | | |
| Z 4.16 | Z 3,452.98 | Z 673.14 | Z 10,075.54 | Z 183.30 | Z 287.80 | Z 317.44 | Z 3,435.00 | Z 1,184.86 | X 875,535.98 |

Inventor
Bernis M. Shipley
By *Earl Beust*
*Henry E. Stauffer*
His Attorneys

Patented Jan. 12, 1932

1,840,639

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 24, 1922. Serial No. 576,924.

This invention relates to cash registers and the like, and more particularly to that type of machine shown in Letters Patent of the United States, No. 1,230,864, issued to W. A. Chryst on June 26, 1917, and Letters Patent of the United States Nos. 1,242,170 and 1,394,256, issued to F. L. Fuller on October 9, 1917 and October 18, 1921 respectively, and also in Letters Patent of the United States, No. 1,619,796, issued to Bernis M. Shipley on March 1, 1927.

One object of this invention is to provide a cash register which is adapted to be used in connection with a banking business, although it will be evident when the invention is understood that it can be applied to a great many other lines of business with successful results.

Another object is to construct a machine of the type shown herein which will print in any one of a plurality of parallel columns in addition to the usual printing done by a machine of this type.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said figures:

Fig. 2 is a detail view of the mechanism for selecting and releasing the group of type carriers that is to print.

Fig. 3 is a detail view of the release key and some of its cooperating mechanism.

Fig. 4 is a detail view of a part of the release mechanism.

Fig. 5 is a side elevation of the register with the motor removed to show the clutch, the switch and the driving mechanism.

Fig. 6 is a detail section taken on line 6—6 of Fig. 7, looking in the direction of the arrows.

Fig. 7 is a right side elevation of the machine with the cabinet removed, and shows the release key and the means for giving the machine two continuous operations on total taking operations.

Fig. 12 is an enlarged detail sectional view of one of the type carrying units.

Fig. 13 is an enlarged front view of one of the type carrying units.

Fig. 14 is a sectional view taken beside the transaction bank and includes the column printing mechanism.

Fig. 15 is a rear elevation of the column printing mechanism.

Fig. 16 is a sectional view taken on line 16—16 of Fig. 14.

Fig. 17 is a detail view of the cam and its cooperating means for rotating type carrying units bodily after they are disconnected from the racks.

Fig. 18 is a front elevation of the paper carriage.

Fig. 19 is a detail sectional view taken on the line 19—19 of Fig. 18, looking in the direction of the arrows.

Fig. 20 is a detail sectional view taken on line 20—20 of Fig. 18, looking in the direction of the arrows.

Fig. 21 is a detail sectional view taken on line 21—21 of Fig. 18, looking in the direction of the arrows.

Fig. 22 is a detail section taken on line 22—22 of Fig. 23, looking in the direction of the arrows.

Fig. 23 is a detail view of part of the paper carriage looking from the rear, and shows the ribbon feeding mechanism.

Figure 24:
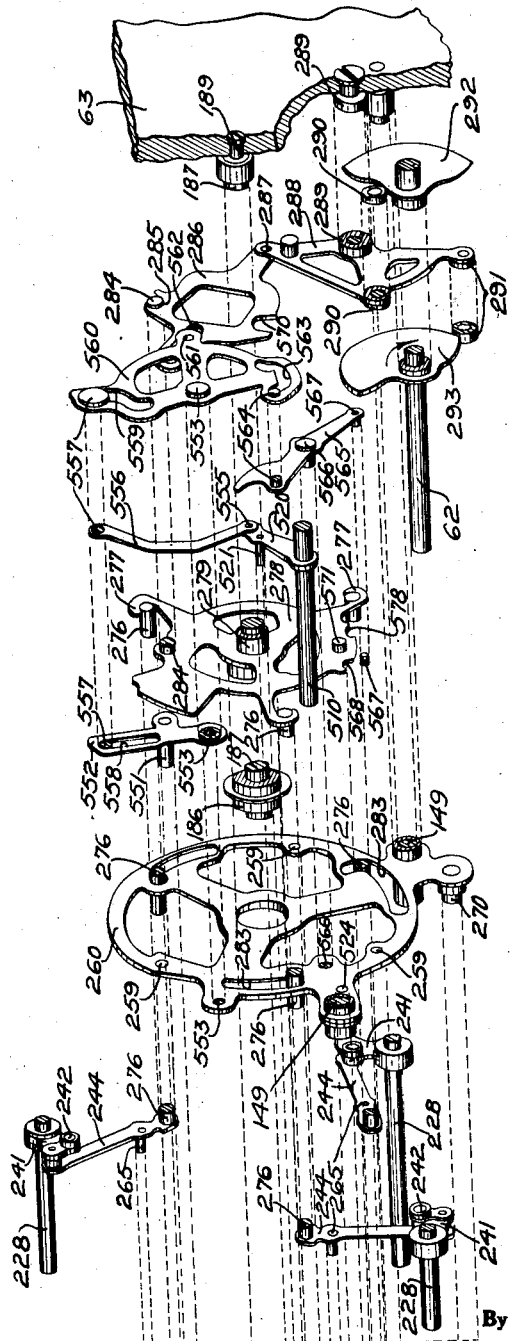

Figs. 24A and 24B, taken together, constitute a disunited perspective view of the totalizer engaging controlling mechanism.

Fig. 25 is a view of one of the totalizer lines and shows the mechanism for selecting the desired totalizer.

Fig. 26 is a detail view of the pair of cams and the arm for operating the upper rack aliner.

Fig. 27 is a detail of the rack and pinion which drives the upper cam line.

Fig. 28 is a detail view of the pair of cams and the arm for driving the rack shown in Fig. 27.

Fig. 29 is a facsimile of the type of record sheet adapted to be used with the present machine.

In General

The machine of the present application is shown as adapted for use in a bank or similar institution. It is to be understood, however, that it is susceptible of many other applications to various lines of business and it is not the intention to limit the invention to the form shown herein.

The invention is shown applied to a well known type of cash register which has three lines or sets of totalizers. The selection of the totalizers to be operated is determined by various manipulative means which form a part of the keyboard.

The machine is adapted to print an item in any one of a plurality of columns, as determined by the manipulation of the keyboard, and at the end of the day the total of each of these columns and the grand total of all of them may be printed from groups of totalizers provided for this purpose. Another group of totalizers is provided for keeping periodical totals, such as weekly or monthly, of the items entered in each column. These weekly or monthly totals are printed at the head of each column at the commencement of the day's business to show the total amount entered to date in its particular column.

The usual printing mechanism used with machines of this type, and which is well known in the art and shown in the above mentioned patents, is included in this machine. It prints on a detail strip, a check and an inserted slip. The amounts printed thereby are the same as those printed in the upper or column printer, and the type wheels of said usual printer are set up by the manipulation of the same keyboard. As this mechanism forms no part of the present invention, however, no further discussion thereof will be given herein.

*Operating mechanism.*—The present machine is adapted to be operated by an electric motor of any suitable design. This motor is mounted on the left side of the machine, and connected to the driving mechanism of the machine by means of a clutch. This clutch includes a shell 50 (Fig. 5) which is driven by the motor. Rotatably mounted in the left hand side frame 51 of the machine is a shaft 52 carrying a disk 53 having notches 54 in which are rollers 55 loosely mounted on pins 56 carried by a disk 57 loose on the shaft 52. These rollers are forced away from the shorter sides of the notches by spring-pressed pins 58 carried by disk 53. It is evident that when disk 50 is rotated counter-clockwise (Fig. 5) by the motor, the rollers 55, when the disk 57 is released, will wedge between the longer side of the notches 54 of the disk 53 and the inner periphery of the shell 50 and will cause the disk 57 and shaft 52 to rotate with the shell 50 in a counter-clockwise direction.

Fast on shaft 52 is a pinion 59, the teeth of which engage the teeth of a gear 60 loose on a stud mounted in the side frame 51. This gear 60 meshes with a gear 61 fast on a main drive shaft 62 supported by the left hand side frame 51 and a right hand side frame 63. This shaft receives one complete rotation at each adding operation.

It may sometimes be desirable to operate the machine by hand, and for this purpose there is provided a crank 64 (Fig. 7) which has integral therewith a pin (not shown) adapted to project into a tube rotatably mounted in the side frame 63. The end of this tube is connected with the crank by any suitable clutch mechanism so that the crank may be easily detached. Fast on the said tube is a gear 65 meshing with a large gear 66 supported by a stud 67 in the side frame 63. The gear 66 meshes with a gear 68 fast on the main drive shaft 62. The ratio of these gears is such that two rotations of the crank will cause one rotation of the shaft 62.

*Release mechanism.*—The driving mechanism is released by means of a release key 70 (Figs. 1, 3 and 7) whose shank is bifurcated to slide over two screws 71 carried by a slide 72. The purpose of this type of mounting for the key 70 is to enable any one to remove the release key and thereby prevent operation of the machine. The slide is supported by two screws 73 projecting through slots 74 in said slide and carried by the side frame 63. The slide 72 carries a pin 75 extending through the side frame 63 and projecting into the bifurcated end of a two-armed lever 76 pivoted on a stud carried by side frame 63. The other arm of lever 76 carries a pin 77 projecting through the bifurcated end of an arm 78 pivoted on a shaft 79 supported by side frame 63. This arm 78 is made integral with a hook 80 by a yoke 81. The hook 80 cooperates with a pin 82 carried by an arm 83 pivoted on a shaft 84 which runs entirely across the machine, and is supported in the machine frames. Arm 83 is made integral with an arm 85 by a yoke 86 and arm 85 has teeth formed on its lower end 87 which mesh with teeth formed on a collar 88 mounted on shaft 79. This collar 88 has an arm 89, the flattened end of which engages a flat side of a pin 90 carried by an arm 91 which is loose on the release shaft 84. Integral with the arm 91 is a projection 92 which has a flat side cooperating with a pin 93 carried by an arm 94 fast on shaft 84. An arm 95 loose on the shaft 79 lies adjacent to and is connected to the arm 89 by a spring 96.

When the release key 70 is depressed to release the machine the lever 76 is rocked counter-clockwise (Fig. 3) by the slide 72 and pin 75. This movement through pin 77 rocks arm 78, yoke 81 and hook 80 clockwise. The hook engages the pin 82 and rocks said pin and its arm 83 clockwise, thereby also rocking arm 85 through yoke 86 in the same direction. This movement of arm 85 through its teeth 87 (Fig. 4) rocks collar 88 counter-clockwise and thereby moves arm 89 from in front of pin 90, thus stretching spring 96 as the arm 95 contacts with the pin 90 and cannot rotate with collar 88. This movement permits the pin 90 to move to the left (Fig. 4) between arms 89 and 95. As the pin 90 is carried by arm 91 this arm and the projection 92 are rocked clockwise (Fig. 3). This movement of the projection 92 permits the pin 93 and arm 94 and therefore the release shaft which is under the tension of a spring 97 (Fig. 7) to be rocked clockwise (Figs. 3, 4 and 7) and counter-clockwise (Fig. 5).

When the release shaft is rocked counter-clockwise, as seen in Fig. 5, an arm 101, having a hook 102 normally under a roller 103 carried by an arm 104 of a lever 108 pivoted at 105 to the side frame 51, is moved away from under said roller, which permits said arm 104 to be rocked counter-clockwise under the influence of a spring 106 extending between an arm 107 integral with arm 104 and a stud on the side frame. The lever 108 is normally in engagement with a shoulder 109 formed on disk 57 and a shoulder on a disk (not shown) secured to the shaft 52. As arm 108 is integral with arm 104 it will be rocked counter-clockwise out of locking position upon the movement of the release shaft and will thereby permit the shaft 52 to be rotated by the motor when the contact is made.

Behind the disk 57 (Fig. 5) is another disk (not shown), loose on the shaft 52, which is normally under spring tension and which when released by the movement of the locking lever 108 rocks a lever 110 pivoted on side frame 51 by means of a cam surface on its periphery. The lever 110 has an arm 111 which cooperates with a roller 112 carried by an arm 113 pivoted to the side frame 51 and rocks said arm clockwise (Fig. 5). This arm has a projection which carries insulating material 114 and when said arm 113 is rocked as above described the insulating material engages and depresses two spring contacts 115 far enough to make contact with stationary contacts 116 (Fig. 5). The circuit through the motor is thereby closed and the motor operated.

Just before the end of the operation the beforementioned disk which closes the motor circuit is arrested, thereby permitting the lever 110 to be rocked counter-clockwise as the spring contacts move to break the circuit. Pivoted to arm 104 is a depending inverted T-shaped arm 117 which at its lower end cooperates with a roller 118 carried by gear 60. Near the end of the operation the roller 118 comes into contact with the lower end of an arm 117 and raises it, thereby rocking arm 104 and lever 108 clockwise. This brings the end of lever 108 into the path of shoulder 109 and when they come in contact the clutch connection is separated and the drive shaft stopped in its normal position. The hook 102 is returned to its normal position at the end of the operation in a manner to be presently described and assumes its position beneath roller 103 on arm 104 and maintains this arm and lever 108 in their normal positions.

In order to insure the complete return to normal position of the drive shaft 62 there is provided a cam 119 (Fig. 7), fast to gear 68. Cooperating with this cam is a roller 120 carried by an arm 121 pivoted to the side frame 63. Fastened to the opposite end of arm 121 is a powerful spring 122 (Fig. 7) extending between said arm and a stud in frame 63. It can be seen that as the shaft 62 rotates, the cam 119 will rock arm 121 clockwise and stretch spring 122. Then just before the end of the rotation the roller 120 passes a high point on the cam and the spring 122 rocks the arm 121 clockwise thereby forcing said shaft to rotate to its home position.

The means for restoring the shaft 84 to normal position at the end of an operation will now be described. It will be remembered that when the shaft 84 is released it is rocked clockwise (Fig. 7) by means of the spring 97. This spring is guided by two guides 126, one behind the other carried on a stud 127 on an arm 128 fast on shaft 84. The spring 97 is compressed between shoulders on the guides 126 and the lower end of a slot 129 in a link 130, the upper end of which also surrounds stud 127. Pivoted on a stud 131 in the side frame 63 is an arm 132 which at its end carries a pin 133 projecting through an opening 134 in the link 130. This arm 132 also carries a roller 135 projecting into a cam groove 136 in the gear 66. This gear receives a one-half rotation at every operation of the register. Just before the gear finishes its one-half rotation a node 137 of the cam groove 136 cooperates with roller 135 on arm 132 and thereby first lowers and then raises said arm. When the shaft 84 is released the stud 127 is moves to the upper end 138 of the slot 129 in link 130 under the influence of spring 97. When, therefore, the arm 132 is lowered as above described the link 130 is lowered to its normal position due to the engagement of pin 133 on arm 132 with a shoulder 139 on link 130. When the link 130, arm 128 and shaft 84 are returned to normal position the pin 93 (Fig. 3) on arm 94 comes into contact with a surface 140 of a restoring lever 141 pivoted on shaft 79 and rocks said lever counter-clockwise. This restoring lever has a tail 142 which is adapted to contact with an extension of the pin 90. When therefore the lever 141 is rocked counter-clockwise, as above described, the tail 142 will rock the pin 90 and arm 91 counter-clockwise and permit the arm 89 of collar 88 to rock clockwise under the influence of spring 96. This movement of collar 88 moves arm 85, hook 80, lever 78, lever 76, slide 72 and key 70 to their normal positions, assisted by a spring 143 extending between lever 76 (Fig. 3) and a stud on the frame.

*Keyboard.*—The keyboard of the present machine (Fig. 1) consists of eight banks of amount keys 150, one bank of transaction keys 151, a total lever 152, and the release key 70 previously described. There is also a key 153 for disabling the check printing mechanism (not shown). The operation of this keyboard sets up the amount and determines in what column it is to be printed in adding operations. The total lever controls the machine on total and subtotal printing operations.

*Amount keys.*—There are eight blanks of amount keys 150 in the present machine. It is of course understood that the registering capacity can be either increased or decreased without in any way departing from the spirit of the invention.

The amount keys 150 (Fig. 11) cooperate with key detents 1511 and locking plates (not shown). The detents 1511 are supported at their upper and lower ends respectively by arms 146 and 147 loosely pivoted on pins 154 on the key frames 155. When a key is depressed the inclined edge of a shoulder 156 on the key engages a corresponding pin 157 on the detent, thus moving the latter downwardly until the shoulder is past the pin when the detent rises slightly, retaining the key in depressed position. The arm 147 engages a pin 158 on an arm 159 fast on a short shaft 160 to which is also secured a zero stop pawl 161 which is normally in effective position, and when the detent 1511 is moved downwardly the pawl 161 is rocked clockwise to render it ineffective. A spring 162, connected at its lower end to the pawl 161 and at its upper end to the key frame, serves to retain the pawl and the detent in normal position.

The usual locking plates (not shown) are provided for locking the depressed keys in their depressed positions and the underpressed keys in their underpressed positions thereby preventing manipulation of the keys during an operation of the machine. In order to move the locking detents into locking position the upper supporting arms for these plates have slots 165 surrounding a rod 166 carried by a plurality of arms 167 fast on the release shaft 84. It will be remembered that this shaft is rocked first counter-clockwise and then clockwise (Fig. 11) thereby moving the said locking plates into and then out of locking position.

Figure 1:
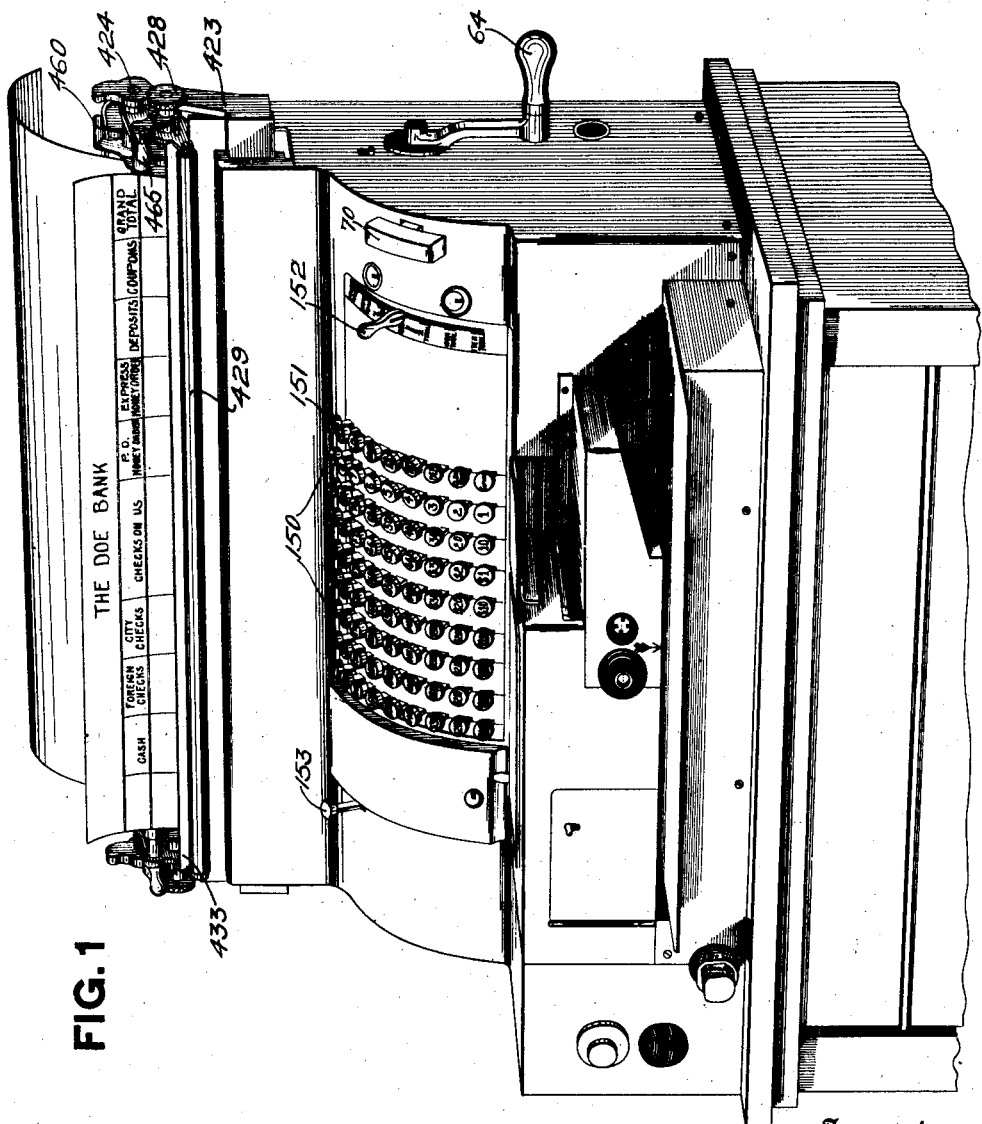
Fig. 1 is a perspective view of the entire machine.

*Transaction keys.*—In the present machine there is but one bank of control keys 151 (Figs. 1 and 14). These keys control the selection of totalizers for operation on adding operations and also determine which of the columns of the wide record sheet shown in Figs. 1 and 29 will be printed in.

Each of the keys of this bank carries a pin 169 which, when depressed, will enter one of a plurality of curved slots in a detent 170, which is carried by two arms 171 pivoted to the key frame, and thereby lower said detent. When said detent is moved downwardly a nose 172 formed on the upper one of said arms 171 engages with a notch in an arm 173 loose on shaft 84 and held in contact with the nose 172 of arm 171 by means of a spring 174, thereby retaining said detent in its moved position. At the end of the operation when the release shaft 84 is restored, an arm 175, which is fast on shaft 84, engages a pin 176 on the arm 173 and forces the notch therein out of engagement with the nose 172 on arm 171 and thereby permits a spring (not shown) to return the detent 170 to normal position. The lower one of arms 171 has a hook 177 contacting a pin 178 on an arm 179 fast on a short shaft 180 supported by the key frame to which is also secured a zero stop pawl 181. When the detent is lowered the hook 177 will rock the arm 179 and therefore the zero stop pawl 181 counter-clockwise (Fig. 14) to ineffective position.

*Total lever.*—The total lever 152 is integral with a nearly circular disk 185 (Fig. 24A) loose on a hub 186 surrounding a rod 187, one end of which is carried by a hanger 188 and the other end held by a screw 189 (Fig. 24B) in the frame 63. The hanger 188 has two arms 148 mounted on rods 149 extending between the frames 51 and 63. When the total lever 152 is used to control the machine for taking the total or sub-total of the grand totalizer, it becomes necessary to lock out the keys 151 of the control bank. This lock out occurs when the total lever is moved into the first position above or below the "add" position. Mechanism for doing this includes the shaft 535 (Fig. 24A) having secured thereto a segment 222 meshing with teeth on the under side of a rack 223. This rack also has teeth on its upper edge meshing with a segment 224 having secured thereto a segment 225 meshing with an interlocking slide 252 having two lugs 253 adapted to cooperate with the lower end of the hook 177 (Fig. 14) of the arm 171 supporting the lower end of the detent 170 associated with the control keys 151. When the total lever 152 is in the "add" position, the space between the two lugs 253 is in alignment with the hook 177 of the detent arm 171, and therefore, any of the keys can be depressed as the hook will enter this space. However, whenever the first position above "add", or the first position below "add", through the shaft 535, segment 222, rack 223, and segments 224 and 225, the interlocking slide 252 is moved either to the right or the left (Fig. 24A) depending upon whether the total lever has been moved above or below "add", thus placing one of the projectitons 253 in the path of the hook 177 of the detent arm 171. Thus the positioned lug 253 forms an obstruction to prevent movement of this hook, and consequently, depression of any of the keys 151 when the total lever is in either of the positions mentioned. This total lever, through mechanism to be hereinafter described, controls the machine for total and subtotal printing operations.

*Differential mechanism.*—The differential mechanism of the machine is employed differentially to operate the different totalizers and to select them for operation and also to set type carriers in both the upper and lower printing mechanisms as controlled by the banks of keys. The amount differential mechanism will be described first.

*Amount differential units.*—There is one complete differential unit for each amount bank but as they are identical in construction and operation only one will be described.

To drive the differential mechanism of the machine the drive shaft 62 is provided with a plurality of pairs of cams 190 and 191 (Fig. 11), each pair cooperating with rollers 193 and 192 respectively, carried by Y-shaped levers 194, of which there is one for each bank of keys in the machine. Each of these levers 194 is pivoted at 195 on a corresponding frame 196. Loosely mounted on hubs 197 carried by the frames 196 which support the differential units adjacent the amount banks of keys are differentially movable actuators 198 carrying segments 199 and transfer arms 200 for operating totalizer pinions 201. The levers 194 at the ends of their upwardly extending arms are pivotally connected by links 202 to driving segments 203 loose on the hubs 197. The driving segments 203 adjacent the banks of amount keys are connected to the differentially movable actuators 198 by latches 204, each of which is supported by an arm 205 and a lever 206 pivoted on the corresponding differentially movable actuator. Springs (not shown) hold the rear ends of the latches 204 in engagement with shoulders on the driving segments. When the segments 203 are driven by their cams 190 and 191, the differentially movable actuators 198 are carried with their latches up to points where the forwardly extending arms of the levers 206 engage the depressed amount keys. Such engagement results in disengagement of the latches from the driving segments and engagement of the forward ends of the latches with the particular one of a series of notches 207 formed in a plate 208 opposite the latch when it is broken. The plate 208 is supported by the frame 196. Upon return movement of the driving segments to normal position pins 220, mounted on the differentially movable actuators 198, are engaged by the inside of the driving segments and said actuators are thereby returned to normal positions. If a key is not depressed in an amount bank the zero stop pawl 161 for that particular bank operates the latch to arrest the differentially movable actuator in its zero position. When a key is depressed the zero stop pawl is moved out of operative position, as above described.

*Control bank differential mechanism.*—The differential mechanism which cooperates with the bank of transaction keys is similar to those which are used with the amount banks, the actuators 198 being omitted and arms 209 (Fig. 14), substituted therefor. If no transaction key is depressed the latch is disengaged from the driving segment 203 in the zero postion due to the engagement of an arm 210 loose on hub 197 with the zero stop pawl 181. A stud 211 carried by lever 206 extends through a slot 212 in arm 210 so that when this arm comes into contact with the zero stop pawl the lever 206 will be rocked counter-clockwise (Fig. 14) and will thereby disconnect the latch.

Appropriate to each amount differential mechanism and the transaction differential mechanism is a beam 221 (Figs. 11 and 14) pivoted at one end to the differentially movable actuators 198 and arm 209 and being bifurcated at its opposite end to straddle a roller 213 carried by a link 214. At its lower end this link is pivoted to an arm 215 fast to a spiral segment 216 loose on a shaft 217. These spiral segments mesh with spiral gears 218 fast on shafts 219 which, through mechanism shown and described in the before mentioned patents, transmits the differential movement of the differentially movable actuators 198 and arm 209 to the type wheels of the lower printing mechanism which is not shown herein. This differential movement is also transmitted to the upper type wheels by means to be described later.

*Totalizers.*—The totalizers shown in the present machine are well known and therefore only a brief description thereof will be given herein. Reference may be made to the patents before mentioned herein if a more extensive description thereof is desired.

There are three lines of totalizers in the machine. Two of these lines consist of a plurality of totalizer pinions 201 loosely mounted on a tube 226 supported by frames 227. These frames are slidably mounted on a shaft 228. One of these lines of totalizers is shown in Fig. 25. Each totalizer of the individual totalizers consists of one pinion 201 in each group of pinions. Therefore if the first pinion of each group is engaged with the differential actuators a certain totalizer will be operated, if the second pinion in each group is actuated a different totalizer will be operated, etc. One of these lines, however, is the grand total totalizer which has only one set or group of pinions, which engage with the actuators on every adding operation. No means is, of course, provided for shifting this line.

*Totalizer selecting mechanism.*—In order to shift the totalizer lines so a to bring any desired one of the totalizers opposite the differential actuators 198 (Fig. 25) the frame 227 carries a boss 229 in which is secured a rod 230 provided with a roller 231 extending into a cam groove 232 in a cam 233 rotatably mounted on a rod projecting from frame 51. There is one of these cams for each totalizer line with the exception of the grand totalizer. Each cam has a rearwardly extending arm 234 to which is pivoted a link 235 (Fig. 15) which at its upper end is pivoted to the end of an arm 236 pinned to a shaft 237 supported by the side frames. Also secured to this shaft is a segment 238 to which is pivoted the upper end of the link 214 (Fig. 14) corresponding to the transaction bank of keys. It can be seen, therefore, that when the machine is operated the differential mechanism for the transaction bank moves the link 214 differentially and through segment 238, shaft 237, arms 236 and links 235 will move the cams 233 to a like extent. This movement of the cams will cause the totalizer lines to be shifted laterally of the machine to move the totalizer corresponding to the key depressed into position to be operated.

For reasons which will be discussed later, it is desired to have two totalizers appropriate to each transaction key. To accomplish this it is only necessary to have the arms 236 (Fig. 15) both fast to shaft 237. As above described, this shaft is given its differential movement by the transaction bank so that if both arms 236 are moved together each of the totalizer lines appropriate thereto will be given the same identical movement and will position the same corresponding totalizer on each adding operation.

*Totalizer engaging mechanism.*—The mechanism for engaging the totalizer lines with the differential actuators for the purpose of operating the selected totalizers will now be described. Near each end of each of the shafts 228 is an arm 241 (Figs. 24B and 25) carrying a roller 242 projecting into a cam slot (not shown) in plates 243 fixed to the frames 51 and 63. Pivoted to each arm 241 is a link 244 moved by means to be hereinafter described, to rock the shafts 228 counterclockwise (Fig. 24B) and clockwise, as viewed in Fig. 11. This movement of the shaft 228 through the engagement of the roller 242 with the cam slot in plate 243 causes the shaft 228 and arms 227 carrying the totalizer pinions 201 to be slid toward the center of the machine, whereby said pinions 201 engage the differential segments 199. This engaging takes place in adding operations after the differential segments have been positioned, under the control of the depressed amount keys 150. When said segments are restored to normal position the amount which was placed thereupon is accumulated upon the totalizer pinions, after which the links 244 are again moved to disengage said pinions from the differential segments.

Figure 11:
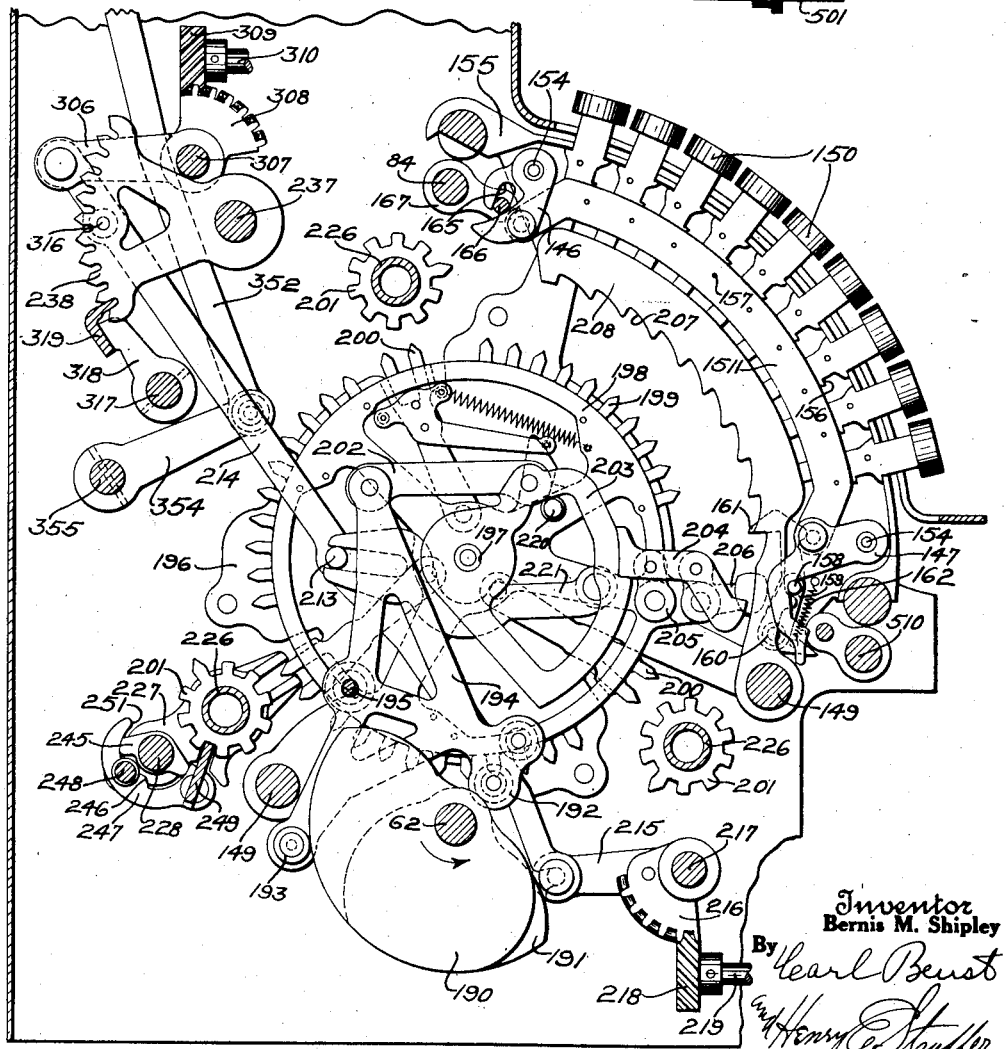
Fig. 11 is a sectional view through the machine taken beside one of the amount banks and shows the keys, differential mechanism and totalizer lines.

When the shaft 228 is rocked clockwise (Fig. 11) a pair of pawls 245 fast thereon engages shoulders 246 of levers 247 pivoted on a rod 248 and rock said levers clockwise (Fig. 11). These levers carry an alining bar 249 normally in engagement with all the pinions 201 on that particular line when they are out of engagement with the differential mechanism. When the levers 247 are rocked clockwise by the pawls 245 the bar 249 is withdrawn from the pinions 201 to allow the selected ones to be rotated. When the selected pinions 201 are in engagement with the segments 199 the remaining pinions are in engagement with aligner lugs 250 on the frames 196 (Fig. 25) and thereby prevent those pinions 201 which are not in alinement with the segments 199 from being turned. When the totalizers are moved out of engagement the pawls 245 strike a surface 251 of the levers 247 and rock said levers counter-clockwise to normal, thereby engaging the bar 249 with the totalizer pinions 201.

*Engaging controlling mechanism.*—From the above description it can be seen how the totalizer lines are rocked into engagement with the differential segments 199.

In machines of this type it is usually desired to have a varying number of the totalizer lines rocked into engagement with said differential segments. As pointed out, however, in the description of the system in use with the present machine, it is desirable in this case to have all three totalizer lines engage upon every adding operation, one of the totalizers being the grand total, another one the periodical total, and the other the daily total.

After the totalizer lines have been shifted to position the totalizers to be operated by the differential segments 199 the selected totalizer pinions 201 are rocked into mesh with said segments. Loose on the hub 186, previously mentioned, is a three-armed lever 256 (Fig. 24A). Associated with each of the arms 257 of the lever 256 is a lever 258 pivoted on a stud 259 (Figs. 24A and 24B) on a hanger 260 loose on the hub 186 and supported by the rods 149. Pivoted on a stud 262 on the lever 258 is a lever 263 having a slot 264 into which projects a pin 265 carried by the previously described link 244. Pivoted on the stud 262 of the lever 258 associated with the "back" totalizer line, is a link 266 carrying a pin 267 engaged by a hook 268 of a lever 269 pivoted on a stud 270 on the hanger 260. The lever 269 has a roller 271 projecting into a cam race 272 of a disk 273 fast on the shaft 62. The configuration of the cam race 272 is such that during rotation of the disk 273 the lever 269 is rocked counter-clockwise thereby lowering the link 266 and rocking the lever 258 clockwise. Through the engagement of said lever with arm 257 the lever 256 is rocked counter-clockwise, thereby rocking the other two levers 258 clockwise. This rocks the levers 263 counter-clockwise with the pin 265 as the fulcrum until pins 274 on levers 263 strikes the outer edge of slots 275 in the disk 185, whereupon the levers rock counter-clockwise with the pins 274 as the fulcrums. This last movement of the levers 263 rocks the links 244 clockwise and disengages pins 276 thereon from hooks 277 on a spider 278 secured to the hub 186 and spaced from the frame 63 by a spacing sleeve 279 supported by rod 187, if said pins were engaged during a previous operation.

The pin 274 of each lever 263 projects into the plane of a disk 280 loose on the hub 186 and spaced from the lever 256 by a collar 282 also loose on hub 186. Springs 283 tend to hold the pins 274 against the disk 280. As in the present machine it is desired that all totalizer lines rock in on every adding operation, no means is provided for rocking disk 280 differentially under control of the transaction keys.

When the lever 269 is rocked clockwise to normal position the lever 258 associated with the "back" totalizer line is rocked counter-clockwise to normal position. This movement of the lever 258 starts to rock the levers 263 clockwise with the pin 265 as the pivot point, as above described. However, the pins 274 strike the periphery of the disk 280 thereby causing the levers 263 to be rocked clockwise with the pins 274 as the fulcrum.

This clockwise movement of the levers 263 through their engagement with the pins 265 rocks the links 244 counter-clockwise and engages the pins 276 which project through slots 283 in the hanger 260 with the hooks 277 on the spider 278, as shown in Fig. 24B. Said spider carries a pin 284 engaged by a notch 285 in a link 286 pivoted on a stud 287 on a lever 288 mounted on a stud 289 on the frame 63. The lever 288 carries two antifriction rollers 290 and 291 which cooperate with cams 292 and 293 respectively, fast on shaft 62.

Clockwise movement of cams 292 and 293 through rollers 290 and 291 rocks the lever 288 first clockwise and then counter-clockwise to normal position. The clockwise movement of the lever moves the link 286 to the right (Fig. 24B) thereby rocking the spider 278 clockwise. As the pins 276 are engaged by the hooks 277 it can be clearly seen that the said pins will be moved in the long portion of the slots 283 whereby, through the links 244, the arms 241 are rocked counter-clockwise (Fig. 24B), whereby the rollers 242 on the arms 241 are moved in the slots of the plates 243 and as previously described move the totalizer pinions 201 into engagement with the differential segments 199. When the lever 288 is rocked counter-clockwise to normal position the link 286 is moved to the left thereby reversing the movement of the spider 278 and moving the pins 276 and consequently the links 244 to the positions shown.

*Aliner for totalizer engaging mechanism.*—Fast on the right hand end of each of the tubes 226 (Fig. 25) which support the totalizer elements is an aligning stud 294 in which are cut eleven grooves 295. Fast on each of the shafts 228 is a collar 296 carrying two teeth 297 which are normally out of engagement with the grooves 295. When, however, the totalizer elements are engaged with the differential actuators as above described, the shaft 228 is rocked and will thereby bring the teeth 297 into engagement with the grooves 295 in order to properly aline and hold the totalizer line in its adjusted position. When the shaft 228 is rocked to normal position the teeth 297 are disengaged from the grooves 295 and the totalizer line is free to be given a lateral adjustment.

Column Printer

*Setting means.*—It will be remembered that each link 214 (Figs. 11, 14 and 15) is given a differential adjustment commensurate with the value of the key depressed in its corresponding bank. At its upper end these links are pivoted to arms 306 loosely mounted on a shaft 307 supported by the side frames 51 and 63. Integral with the hubs of the arms 306 are spiral segments 308 meshing with spiral gears 309 fast on shafts 310 supported by two transverse frames 311 and 312 mounted on the side frames 51 and 63. Fast on these shafts 310 are segment gears 313 (Figs. 14 and 16) which mesh with teeth formed on racks 314 mounted to slide transversely of the machine on rods 315 supported by frames 311 and 312. It can be seen from the above that when the links 214 receive their differential movements, as previously described, the arms 306 and spiral gears 308 integral therewith are moved a corresponding distance. This movement is transmitted to the racks 314 by means of the spiral gears 309, shafts 310 and segments 313 so that the racks are given a movement corresponding to the value of the key depressed.

Means is provided for alining the spiral gears and racks. Loose on shaft 237 (Fig. 14), are a plurality of segments 238 which are pivoted at 316 to the links 214 (Figs. 11 and 14). It will be seen that by this connection segments 238 are positioned in accordance with the adjustment of the links 214. Fast on a shaft 317 are arms 318 supporting an alining bar 319 having one edge thereof formed to co-operate with teeth on the segments 238. The alining bar is normally in engagement with the teeth of segments 238 and thereby holds them in proper alinement.

It is of course necessary to rock the alining bar out of engagement with the segments when the racks are to receive their differential movement. To accomplish this there is an arm 320 (Fig. 14), fast on shaft 317, to which is pivoted a link 321 (Figs. 14 and 26) which at its lower end is pivoted to a lever 322 loosely mounted on a stud 323 supported by the machine side frame. The lever 322 carries two anti-friction rollers 324 and 325 cooperating with a pair of cams 326 and 327 respectively, fast on shaft 62. This shaft receives one clockwise rotation (Fig. 26) at each operation and the configuration of the cams is such that lever 322 is given first a counter-clockwise and then a clockwise movement to normal position. This movement lowers the link 321 and through arm 320 rocks shaft 317 clockwise, thereby disengaging the alining bar 319 from the teeth of segments 238 and permitting them to be moved. After the setting up of the racks has taken place the above described parts are returned to normal position and the alining bar 319 again engages the teeth of segments 238.

*Type carriers.*—The means for printing on the record sheet consists of a plurality of groups of type wheels, one group for each column on the record sheet. The type wheels 330 (Figs. 12, 13, 14 and 16) of each group are loosely mounted on a shaft 331 supported at its ends by a yoke 332. Integral with yoke 332 is a tube 334, into the upper end of which extends a rod 335 (Fig. 12) which is integral with a collar 336 loose on a shaft 337. The tube 334 is made fast to the collar 336 by a screw 338, the head of which abuts against shoulders on the inside periphery of said tube 334. The upper portion of the tube has teeth 339 formed thereon, the purpose of which will be hereinafter described. The teeth formed on racks 314 mesh with corresponding depressions in the periphery of the type wheels 330 so that when one of the racks is moved the type wheel of that denomination in each group which normally meshes therewith will receive the differential adjustment imparted to the said rack by its corresponding differential mechanism. As the type wheels 330 are lowered into engagement with the racks 314, the yokes 332 are held rigid in vertical alignment by a nose 304 (Fig. 13) extending downwardly from the forward side of the yoke 332 and engaging a slot 305 formed in the upper edge of a bar 364 rigidly secured to the frame 311. It can be seen therefore that the amount to be printed will be set up on each group of type at every adding operation of the machine.

*Lifting mechanism.*—After the type wheels of the various groups are set up by the racks, all of the groups are raised simultaneously out of engagement with said racks. The shaft 337 from which the groups of type carriers are suspended is loosely mounted in the ends of two arms 340 (Figs. 14, 15 and 16) which are fast on a shaft 341 rotatably mounted in side frames 342 and 343 which are supported by side frames 51 and 63 respectively.

Figure 8:
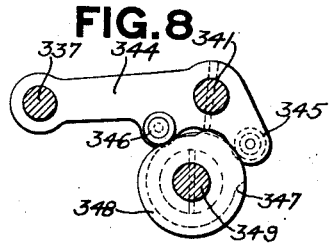
Fig. 8 is a detail view of the cam and arm for lifting and lowering the type carriers from engagement with the racks.

Also fast on shaft 341 is a lever 344 (Fig. 8) which at its forward end surrounds shaft 337. This lever carries two anti-friction rollers 345 and 346 cooperating with two cams 347 and 348 fast on a shaft 349 mounted in the frames 342 and 343. This shaft is given first a clockwise rotation and then a counter-clockwise rotation to return it to normal position at every operation of the machine in a manner to be presently described. This movement will rock the lever 344 clockwise, which will raise the shaft 337, and thereby all of the groups of type carriers, far enough to disengage them from the racks 314. As the lever 344 is fast to shaft 341 this shaft and arms 340 will also be rocked clockwise in order to assist the lever 344 in raising the groups of type carriers.

The means for rotating shaft 349 first clockwise and then counter-clockwise (Fig. 14) will now be described. Fast on the shaft 349 are two pinions 350 and 351 (Figs. 14 and 15) which cooperate with two racks 352 and 353 respectively. A roller 328 carried by an arm 329 engages the rear edge of each of said racks to maintain them in engagement with pinions 350 and 351. At their lower ends these racks are pivoted to arms 354 fast on a shaft 355 mounted in side frames 51 and 63. Also fast on this shaft is an arm 356 (Fig. 15) to which is pivoted a link 357 (Fig. 28) which, at its opposite end, is pivoted to a lever 358 pivotally mounted on shaft 323. This lever carries two anti-friction rollers cooperating with two cams 359 and 360 fast on shaft 62. As this shaft receives one complete rotation on every adding operation the cams 359 and 360 will rock the lever 358 first counter-clockwise and then clockwise (Fig. 28). This movement, through link 357, arm 356, shaft 355 and arms 354, will lower the racks 352 and thereby rotate pinions 350 and 351 clockwise and then return these parts to their normal positions.

*Type wheel aliners.*—As the type wheels are withdrawn from engagement with the racks 314 they are engaged by aliners to prevent movement of said wheels. These aliners will now be described. Each of them consists of a bar 361 slidably mounted in a slot 362 in the yoke 332 (Figs. 12, 13, 14 and 16). At its right hand side (Fig. 14) the bar 361 has an ear 301 projecting therefrom and resting on a plate 363 which in turn rests on the frame bar 364 supported by frame 311. The plate 363 has elongated slots surrounding the shaft 331 and a stud 365 fast in said yoke 332. Two arms 366 fast on a short shaft 367 mounted in said yoke 332 project through openings in bar 361 and constantly tend to force it downwardly (Fig. 13) due to springs 368 which surround shafts 367 and bear against arms 366. It can be seen from Fig. 13 that the aliner bar 361 is normally held up out of engagement with the type wheels by the engagement of the plate 363 with the ear on said bar 361. When, however, the type wheels are raised as above described the plate 363 remains in its normal position and arms 366 are permitted to rock counter-clockwise (Fig. 13) under the influence of springs 368 and lower the alining bar into engagement with the type wheels as the yoke 332 moves up. When the type carriers are again lowered near the end of the operation of the machine the slotted plate 363 engages the projecting ear 301 of bar 361 and shifts said bar out of engagement with said type wheels.

*Group rotating mechanism.*—After the groups of type carriers have been elevated out of engagement with the racks, all of the groups are rotated bodily a one-quarter turn toward the left, as seen in Figs. 13 and 16, in order to bring the said groups into position to print. The means for accomplishing this movement will now be described.

It will be remembered that each group has vertically disposed teeth formed on the tube 334 thereof (Figs. 12, 13, 16 and 17). Meshing with these teeth on all of the groups is a rack 370 having slots 371 surrounding screws 372 in the upper edge of frame 311 Fig 17. The rack 370 has two ears 373 projecting from its rear edge between which extends the end of an arm 374 which at its lower end is pivoted to the frame 311. Midway of its length the arm 374 carries an anti-friction roller 375 projecting into a cam groove 376 formed in a box cam 377 fast on the shaft 349. This shaft receives first a clockwise and then a counter-clockwise movement (Fig. 14) on adding operations, as above described. When the cam 377 is given its clockwise rotation the arm 374 will be moved toward the right (Fig. 17) at the proper time, thereby moving rack 370 to the right also. This movement rotates all of the pinions 339 in a clockwise direction and thereby rotates all of the type carrying groups a one-quarter turn and brings them into the position in which the printing takes place.

*Selecting mechanism.*—After all of the type carrying groups are raised out of engagement with the racks and rotated to bring them into printing position it is necessary to select the group that is to print. This selection is made under control of the transaction keys 151 (Figs. 1 and 14). As before described, the differential mechanism for the transaction keys operates a link 214 differentially, in the same manner as the links 214 for the amount banks are operated. The link 214 for the transaction bank is pivoted to an arm 381 (Fig. 15) of a bell crank loose on shaft 307. The other arm 382 (Figs. 14 and 15) of the bell crank has pivoted thereto a link 383 which link at its opposite end is pivoted to an arm 384 (Figs. 2 and 14) fast on a shaft 385. Fast on this shaft 385 are a plurality of segments 386, one for each group of type carriers. These segments each carry a differently located tooth 387 which is adapted to cooperate with a lug 388 carried by a link 389, there being one link for each segment It can be seen from the above that when the link 214 for the transaction bank is moved differentially under the control of the transaction keys to select the column to be printed in, the said differential movement will be transmitted to the segments 386 by means of arm 381, arm 382, link 383, arm 384 and shaft 385. As the single teeth 387 are placed differentially on segments 386 only one of said teeth for each operation of the machine will be in position to cooperate with its corresponding lug 388 and thereby release the particular group of type carriers corresponding thereto for that operation, as will be described later.

*Impression means.*—When the groups of type carriers have been set, raised and turned, and when the segments 386 are set, to select the particular group that is to print, means are provided for releasing the selected group and rocking said group about shaft 337 until it comes into contact with the record sheet held in a carriage, to be presently described.

The means for releasing the selected group of type carriers will be described first. Each link 389 (Figs. 2 and 15) is pivoted at its upper end to a lever 390 loose on a shaft 391 supported in the side frames 342 and 343. The forward ends of these levers 390 have notches 392 each engaging with a nose 393 on an arm 394 on the collar 336 for the particular group of type carriers. The links 389 have slots 395 formed therein through which extend rods 396 carried by levers 397 and two arms 398 fast on shaft 341. The levers 397 each carry two rollers cooperating with two cams 399 and 400 fast on shaft 349 (Figs. 2 and 15). As shaft 349 is rotated first clockwise and then counter-clockwise to normal position it can be seen that the levers 397 will also be moved first clockwise and then counter-clockwise. As the levers carry rods 396 projecting through the slots 395 in links 389, these links will all be rocked clockwise and then counter-clockwise (Fig. 2) with their upper ends as the pivot points. As the links are rocked clockwise, the lug 388 on one of them will come into contact with the tooth 387 which has been positioned to cooperate with it by the transaction keys, as above described. When this occurs the link 389 whose lug 388 has contacted with the tooth on its corresponding segment 386 will be slightly lowered due to the angle or cam face of the lug 388, to disengage the notch 392 from the nose 393.

Just before the notch 392 is disengaged from the nose 393 a series of arms 401 (Figs. 12, 13 and 14) fast on shaft 337 are rotated in a clockwise direction (Fig. 14) to remove them from the path of pins 402 carried by the arms 394 of collars 336 so as to permit one of these collars and the type carriers mounted therein to be rocked clockwise to make a printing impression. In order to accomplish the above described movement shaft 337 carries fast thereto an arm 409 (Fig. 9) having a bifurcated end with which a stud 403 carried by a lever 404 loose on shaft 341 cooperates. The lever 404 carries two rollers 405 and 406 cooperating with cams 407 and 408 respectively, fast on shaft 349. When, therefore, the shaft 349 is given its clockwise movement the lever 404 will be rocked counter-clockwise (Fig. 9), which through stud 403 and arm 409 will rock shaft 337 and arms 401 clockwise out of the path of pins 402.

After the arms 401 have been removed from the path of pins 402, as above described, then when the lever 390 is rocked to remove the notch 392 from engagement with the nose 393 of arm 394, the group of type carriers which has been selected is free to rock clockwise (Fig. 14) to make an impression on the record sheet. This rocking is done by a spring 4091 (Figs. 2, 12, 14, 15 and 16) stretched between the pin 402 and a rod 410 extending across the entire machine and supported by the side frames 342 and 343.

When the selected type carrying group is released and rocked clockwise (Fig. 14) to print on the record sheet, it is engaged by an aliner in order to prevent any rotary movement of the group during its upward movement. This aliner consists of an arm 411, (Figs. 14 and 16) one for each of said groups, fast on a sleeve 412 surrounding shaft 337. Fast to the opposite end of said sleeve is a downwardly extending arm 413. A spring 414 surrounds said shaft 337 and has one end bent around the arm 413 and the other around arm 401, which is fast on said shaft. This spring constantly tends to rock the arm 411 counter-clockwise (Fig. 14). When the selected type carrying group is released and rocked clockwise, as above described, the arm 411 engages between the teeth 339 of the tube 334 and thereby holds the group in proper alinement. When the operated group is returned to its vertical position it is desired to have arm 411 disengaged from the teeth 339. Just before the group reaches its vertical position the arm 413 abuts against a pin 415 mounted in the frame 374 and stops the movement of said arm 413 and arm 411. The operated group, however, continues a short distance further and is therefore disengaged from the teeth 339.

Figure 9:
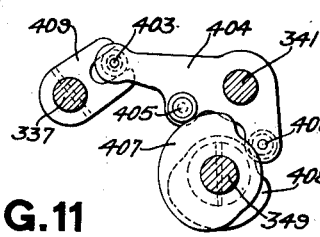
Fig. 9 is a detail view of the cam and its cooperating mechanism for restoring the type carrying arms to their vertical positions.

*Restoring mechanism.*—After an impression has been taken from the type carriers of the selected group the group is returned to its vertical position by the following means. It will be remembered that the arms 401 are rocked clockwise (Fig. 14) by the clockwise rotation of the shaft 349 by the cams 407 and 408 and the arms 409 and 404 (Fig. 9). Then during the latter part of the operation the arms are returned to their normal positions as shown in Fig. 14. When this occurs the arm 401 appropriate to the operated group comes into contact with the pin 402 mounted in arm 394 of collar 336 and thereby rocks the operated group of type carriers counter-clockwise (Fig. 14) to its vertical position, against the tension of spring 4091.

When the operated group has been restored to its vertical position all of the groups are rotated one-quarter turn (Fig. 16) to bring the type carriers into alinement with the racks. This is accomplished when the shaft 349 is rotated counter-clockwise (Fig. 14) by the upward movement of the rack 352. This movement of shaft 349 rotates the drum cam 377 to its normal position and thereby slides rack 370 to the left, as seen in Fig. 17, and rotates all of the groups of type carriers one quarter turn.

The return movement of shaft 349 to normal also causes the shaft 337 to be lowered to bring the type carriers 330 of all the groups into engagement with racks 314, which is their normal position. As the groups are lowered the plate 363 of each will contact with the bar 364 (Figs. 13 and 14), and as the downward movement of the group continues will stop the aliner bar 361 and allow the type wheels to continue their downward movement out of engagement with said aliner.

*Paper carriage.*—The record sheet 416 (Fig. 29) is adapted to be supported by a carriage 417 (Figs. 14 and 18) slidably mounted on ball bearings 418 carried in channels formed by V-shaped grooves 419 and 420 cut in the carriage 417 and in a track 421 supported at its ends by plates 422 attached to the frame 312. At each end of the carriage 417 is an upwardly extending arm 423, these arms being joined near their upper ends by a shaft 424. Near each end this shaft carries an arm 425 loosely mounted thereon in which is mounted a shaft 426 carrying a cylindrical platen 427 of rubber or any other suitable material. Fast on the ends of shaft 426 are two knurled rollers 428 for the purpose of manually rotating the platen 427 to feed the record sheet. Cooperating with the platen are two smaller feeding rollers 429 and 430 (Figs. 18 and 19) loose on rods 431 and 432 respectively. The rod 431 is carried by the arms 425, and the rod 432 is carried by a pair of arms 460 fast on a sleeve 461, surrounding a sleeve 450, loose on the shaft 424. A paper guide 433 surrounds the lower part of platen 427 and is carried by two ears which are mounted on rod 431 (Figs. 14, 18, 19, 20 and 22).

*Paper feed.*—At the extreme right hand side of the machine (Fig. 14) is a link 436 exactly like links 389 which cooperate with levers 390 for releasing the selected group of type carriers. At its lower end this link 436 has a lug 437 which is adapted to cooperate with a lug 438 fast on the side frame 342. A short rod 439 carried by a lever 440 loose on shaft 341 extends through a slot 441 in link 436. The lever 440 carries two rollers which cooperate with two cam disks (Fig. 14) fast on shaft 349. These cam disks are identical with the disks 399 and 400 (Fig. 2) before described except that they are timed slightly ahead of these cams in order to feed the paper before the printing takes place. When the cams which operate lever 440 are given their clockwise rotation (Fig. 14) by shaft 349 they rock the lever 440 clockwise and thereby bring lug 437 into engagement with the cam surface of the lug 438. This lowers the link 436.

At its upper end link 436 is pivoted to a lever 442 which is fast on shaft 391. The lever 442 and a similar lever 443 (Fig. 15) each carry a pin 444. These pins cooperate with notches of arms 445 loose on studs 446 mounted in the machine side frame (Fig. 15). These arms have noses 447 adapted to cooperate with a rod 448 (Figs. 14, 19, 20, 22 and 23) carried by arms 449 fast on a sleeve 450 surrounding shaft 424. Also loosely mounted on rod 448 are two pawls 451 which are normally held against pins 452 by springs 453 stretched between pins on said pawls and on arms rigid with the arms 449. These pawls 451 cooperate with ratchets 454, one of said ratchets being fast to each end of the platen 427.

When the link 436 is lowered, as before described, the levers 442 are rocked clockwise (Fig. 14) which through shaft 391 which rocks arms 445 counter-clockwise and causes the noses 447 to contact with rod 448. This moves said rod 448 downwardly and rocks the arms 449 clockwise (Fig. 20) and cause the pawls 451 to engage the ratchets and rotate the platen in order to bring a clear space on the record sheet 416 into position to be printed on. A retaining pawl 455 cooperates with each of the ratchets 454 and tends to hold them against accidental movement.

*Paper release.*—It is sometimes necessary to change the position of the record sheet 416 relative to the platen 427. For this purpose it is necessary to remove roller 430 from contact with said platen. The roller 430 is loose on rod 432, which is supported by two arms 460 fast on a sleeve 461 (Figs. 19 and 23) surrounding sleeve 450, which in turn surrounds shaft 424. These arms 460 extend upwardly and are bent at right angles to facilitate their operation. When it is desired to shift the record sheet, one or both of the arms 460 (Fig. 19) are rocked counter-clockwise, which movement causes the roller 430 to move away from the platen. Integral with arms 460 are two forwardly extending noses 462 which project over rearwardly extending arms 463 on a shaft 464 supported by the arms 425 (Fig. 19). Also fast to shaft 464 are two levers 465 each carrying a pin to which is fastened a spring 466 fastened at its opposite end to a pin mounted in arm 425 (Figs. 18 and 21). When, therefore, the arms 460 are rocked counter-clockwise (Fig. 19), as before described, the noses 462 will come into contact with the arms 463 and rock them and shaft 464 clockwise. This movement of shaft 464 rocks levers 465 fast thereon and places the spring 466 under tension. When the arms 460 are released, this spring will return the parts to their normal positions.

*Ribbon and ribbon feed.*—The type carriers 330 print through a continuous ink ribbon 467 (Fig. 23). The means for feeding this ribbon will now be described. As there are duplicate feeding means at each side of the carriage, only one will be described. It will be remembered that the rod 448 carried by arms 449 is rocked clockwise (Fig. 22) about shaft 424, as above described, at every operation of the machine. Pivoted on the rod 448 is a link 470 which at its lower end is slotted to surround a pin 471 mounted in the arm 425. The bottom edge of link 470 contacts with the upper end of a link 472 which, near this end, is slotted to surround a pin 473 mounted in a plate 474 fast to the carriage 417. At its lower end the link 472 is pivoted to an arm 475 loose on a stud 476 mounted in plate 474, which stud also carries an ink roller 477 about which the ribbon passes. Pivoted to arm 475 is a pawl 478 which is held in engagement with the teeth of a ratchet 479 fast to ink roller 477 by a spring 480 (Figs. 22 and 23). When therefore the link 470 is lowered as above described it forces the link 472 downwardly and thereby rocks arm 475 counterclockwise (Fig. 23) and, due to the engagement of pawl 478 with ratchet 479, rotates the inking roller 477 and feeds the ribbon one space. A spring-pressed retaining pawl 481 pivoted on an arm 482 of carriage 417 prevents retrograde movement of the inking roller 477. A spring 483 extending between the carriage 417 and a pin carried by the arm 475, returns the parts to their normal positions at the end of an operation.

Tension is maintained on the ribbon by means of a roller 484 mounted on a stud carried by an arm 485 pivoted to an arm 486 pivoted on stud 476. The arm 485 has a nose 459 cooperating with a similar nose rigid with an arm 487 loose on stud 476. This arm 487 has a tail 488 and a spring 489 extends from this tail to a pin fastened in plate 474. This spring is constantly under tension and thereby tends to rock arm 487 clockwise (Fig. 23), and through the nose thereon, and the similar nose 459 on arm 485, rocks this arm counterclockwise and its supporting arm 486 clockwise. This movement causes roller 484 to move downwardly and toward the right as far as the ribbon 467 will permit and thereby keep a certain amount of tension on said ribbon.

*Platen lifting means.*—Means are provided for raising the platen 427 to enable the operator to see what has been printed without changing the position of the paper. The platen is normally latched in its lower position by means of two hooks 490 loose on the shaft 426 (Fig. 21), which engage pins 491 on arms 423. These hooks each have a segmental body 492 having a notch 493 in which projects a pin 494 carried by levers 465. It will be remembered that these levers 465 are under the tension of springs 466 which tend to rock said levers counter-clockwise. This movement holds the hook 490 in engagement with pin 491.

When it is desired to raise the platen the operator grasps either one or both of the levers 465 and lifts them upwardly. This will rock levers 465 clockwise until the hooks 490 are disengaged from the pins 491, which frees the platen and it may be rotated bodily about the shaft 424.

*Platen shifting and interlock therefor.*—It may happen that among the headings on the record sheet there will be one which is used more than the others and which will therefore require space for more than one column. In the present case the "Checks on us" is shown having two columns of figures thereunder. It is of course understood that any of these columns can be so expanded.

Figure 10:
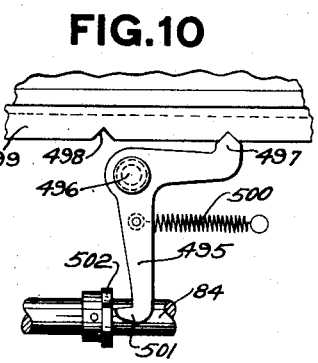
Fig. 10 is a detail view of the means for locking the release shaft unless the carriage is completely moved either to one or the other of its two positions.

To accommodate this expansion the carriage of the present machine is arranged to be slid laterally in the track 421 with the balls 418 as bearings a sufficient distance to bring the overflow column into position to receive the impression. The carriage is yieldingly held in either one or the other of its two positions by a bell crank 495 (Figs. 10 and 14) pivoted on a stud 496 projecting from the carriage track 421. One arm of bell crank 495 has an upwardly extending nose 497 shaped to engage in one of two notches 498 cut in an angle bar 499 fast on the carriage 417. The bell crank is normally held in engagement with one of the notches 498 by means of a spring 500 extending between a pin on the bell crank and a pin on the track 421.

If the bell crank is not in engagement with either of the notches 498 the machine cannot be operated. The lower end of the downwardly extending arm of bell crank 495 has a foot 501 formed thereon. When the carriage is not in one of its proper positions the nose 497 of bell crank 495 is in contact with the lower edge of bar 499. With the bell crank in this position the foot 501 is moved under an arm 502 fast on shaft 84, which is the release shaft of the machine and which is rotated clockwise (Fig. 14) to accomplish this release. It is evident from the above that if the carriage is not in one of its operative positions the foot 501 will be beneath the arm 502 and therefore the shaft 84 cannot be rocked to release the machine. It is also evident that when the machine has been released it is impossible to move the carriage, as the arm 502 moves down in front of the foot 501 on bell crank 495 and said bell crank cannot be rocked sufficiently to remove the nose 497 from notch 498.

*Total and sub-total mechanism.*—In order to allow sufficient time for the selection of a desired totalizer and the engagement of the selected totalizer with the actuating segments 199 when a total or sub-total is to be printed, and also to allow time for the tripped transfer devices to be restored, the main drive shaft 62 is given two continuous rotations on said total and sub-total printing operations instead of one, as in adding operations. During this operation one of the totalizers is moved into engagement with its segments 199 and the engaged totalizer pinions 201 control the extent of movement of the differentially movable actuator 198 and hence the setting of the type wheels to print a total or a sub-total on the record strip.

To permit two rotations of shaft 62 in total and sub-total operations the lever 152 controls mechanism shown in Figs. 6 and 7 to prevent the restoration of the motor locking lever 108 (Fig. 5) to normal locking position until near the end of the second rotation.

Slidably mounted on the stud 67 (Figs. 6 and 7) is a link 506, one end of which is pivoted to a lever 507 loose on the stud 131. Pivoted to the lever 507 is a link 508, also pivoted to an arm 509 fast on a shaft 510 mounted in the machine side frames. The link 506 has a stud 511 engaging a slot 512 in the previously described link 130. The link 506 has two pins 513, one on each side of a flange 514 of a slide 515 mounted in a groove 516 in a disk 517. The link 506 also has an anti-friction roller 518 normally in engagement with a notch 519 in the disk 517, but said roller 518 is moved into a cam groove 505 in disk 517 at certain times, as will be described later. The gear 66 has a circular cut in which the disk 517 lies.

Fast on the shaft 510 (Figs. 24A and 24B) is an arm 520 carrying a pin 521 projecting into a slot 522 in a lever 523 pivoted on a stud 524 in the plate 260.

The movement of the total lever 152, either up or down, rocks a lever 525 pivoted on stud 524 counter-clockwise due to the engagement of a pin 526 on said lever with a slot 527 in the total lever plate 185. This movement through a spring 528 rocks lever 523 counter-clockwise also. Through pin 521, this movement of lever 523 rocks the arm 520 and the shaft 510 clockwise (Fig. 24B). Clockwise movement of the shaft 510 (Fig. 7) rocks the arm 509 clockwise, whereby through the link 508 the lever 507 is rocked clockwise and the link 506 is moved to the left in the direction of its length.

This movement of the link 506, through the engagement of its pins 513 with the flange 514, moves the slide 515 to the left into engagement with a notch in the gear 66, thus connecting said gear and the disk 517. This movement of the slide 515 also moves the roller 518 into the cam groove 505. The movement of the link 506 also rocks the link 130 clockwise about the stud 127. As the disk 517 is connected to the gear 66 the counter-clockwise movement of said gear and disk through the cam roll 518 moves the link 506 still farther to the left and rocks the link 130 still farther, so that when the arm 132 is lowered near the end of the first half rotation of the gear 66 by the node 137, as described in adding operations, the stud 133 moves idly in the elongated portion of the opening 134, thus preventing the link 130 from rocking the shaft 84 to rock the arm 101 (Fig. 5) to normal position. As the arm 101 is not rocked to normal position the lever 108 is not locked near the end of the first rotation of the shaft 62 when the pin 118 raises the link 117 to rock the lever 108 to normal and therefore the spring 106 immediately rocks the lever 108 to allow the motor clutch to drive the gears and shaft 62 a second rotation.

Near the end of the complete rotation of the gear 66 the link 506 is moved to the position to which it was adjusted by the total lever 152 so that when the lever 132 is rocked clockwise the second time by the second node 137 the stud 133 engages a shoulder 530 in the opening 134 to lower the link 130 to rock the arm 128 and shaft 84 counter-clockwise (Fig. 7) slightly past normal position, but not as far past normal as in adding operations. Just before this movement of lever 101 the pin 118 (Fig. 5) rocks the lever 108 to normal, and the arm 101 when moved past normal engages the roller 103 and locks the lever 108 to stop the motor as in adding operations.

In totalizing operations a selected totalizer is moved into engagement with the segments 199 before said segments are moved by the segments 203 and latches 204, whereby the differential movement of the segments 199 is controlled by the totalizer pinions 201. After the actuators 198 have been moved differentially under the control of said totalizer pinions the totalizer is disengaged from the segment 199, thereby leaving the totalizer at zero.

In sub-totalizing operations the totalizer is engaged with the actuator, is moved differentially by the actuator and is held in engagement with said actuator to control the differential movement thereof to print a sub-total. The totalizer is also held in engagement with the actuator while said actuators are being restored, thereby accumulating upon the totalizer the amount which was taken therefrom.

The mechanism whereby the totalizer controls the differential movement of the actuators during total and sub-total operations is not shown herein, as it forms no part of the present invention. It can be found both in the specification and drawings of the Fuller and Shipley patents previously mentioned. It will be sufficient to state herein that the long tooth of each of the totalizer pinions 201 actuates a mechanism which disconnects the latch 204 when the totalizer wheel reaches its zero position. This causes the amount which stood on the totalizer to be set up in both the upper and lower printing mechanisms and printed in the manner previously described.

Means is provided for printing a "Z" beside the amount when a total is printed, and an "X" beside a sub-total, to indicate what the figures represent.

The means for setting up the type to print these symbols will now be described. Connected to the total lever plate 185 by a slot and pin connection is a link 531 (Figs. 14 and 24A) connected at its lower end to an arm 532 loose on the shaft 217. Rigid with the arm 532 is a spiral segment 533 meshing with a spiral pinion 534 fast on a shaft 535. The remainder of the mechanism for setting up the lower type wheels is not shown herein but may be found in any of the above mentioned Fuller patents, particularly in the patent issued to B. M. Shipley, No. 1,619,796.

The link 531 extends upwardly and at its upper end is pivoted to an arm 536 (Figs. 14 and 15) loose on shaft 307. Integral with arm 536 is a spiral segment 537 which cooperates with a spiral pinion 538 fast on a shaft 539 exactly like the segments 308 and pinions 309 for the amount banks. The shaft 539 is mounted in the frames 311 and 312 and carries fast to its forward end a segment gear 540 which meshes with the teeth of a rack 541 (Fig. 16) slidably mounted on the studs 315. This rack has teeth on its upper edge which mesh with the left hand one (Fig. 14) of the type carriers 330. These type carriers have a blank space which is normally in the printing line. On each side of this space are three printing surfaces, those on one side having the character "X" and those on the other the character "Z" thereon.

It can be seen from the above description that when the total lever 152 is moved either up or down out of its adding position the link 531 will move the spiral segment 537 either clockwise or counter-clockwise. This movement, whichever it may be, will be transferred to the spiral pinion 538 and through shaft 539 and segment 540 to rack 541, which will set up an "X" or a "Z" in all the type carrying groups. Then when the desired group is operated one of these characters will be printed to the left of the amount to indicate that it is a total or sub-total.

*Totalizer engaging control.*—In the adding operation the selecting disk 280 (Fig. 24A) causes all of the totalizer lines to be engaged with the actuators. However, in total and sub-total operations, only one totalizer line can be rocked into engagement with the actuators at a time. Therefore it is necessary to render the totalizer engaging controlling mechanism, which operates in adding operations, ineffective, and to select the totalizer line and control its engaging and disengaging with the differential mechanism by the total lever. When the total lever 152 is moved downwardly to one of its three lower positions the corresponding totalizer line is rocked into engagement with the actuator to have the total taken from the selected totalizer. When the total lever is moved upwardly to one of its three positions the corresponding totalizer line is rocked into engagement with the actuator to have the sub-total taken from the selected totalizer.

As previously described in adding operations the link 286 (Fig. 24B) is moved toward the right and through its engagement with the pin 284 rocks the spider 278 clockwise to engage the selected totalizer with the actuators after the actuators have been differentially positioned under the control of the amount keys 150. After the actuators have been returned to normal the link 286 is moved to the left to normal position and disengages the totalizer from the actuators. In total and sub-total operations the time of engaging and disengaging the totalizer is entirely different from that described in adding operations.

The total lever disk 185 has a slot 545 (Fig 24A) into which projects a pin 546 supported by one of the levers 258 and an arm 547 pivoted on the stud 259 of this particular lever 258. The slot 545 has an enlarged portion 548 within which the pin 546 moves idly when the lever 258 is rocked clockwise during adding operations. When the lever 152 is moved in position for total or sub-total operations the slot 545 through its engagement with the pin 546 rocks the lever 258 clockwise and moves all of the levers 263 far enough to position the pins 274 away from the outer periphery of the disk 280. When the pin 546 rocks the one lever 258 the other two are rocked by the three-armed lever 256. Any subsequent movement of the disk 280 has no effect upon the levers 263 or links 244 for engaging the totalizers with the differential actuators as would be the case during adding or listing operations.

As previously described, a movement of the total lever 152 into position for taking totals or sub-totals causes a movement of the lever 525 in a counter-clockwise direction. Pivoted to the lever 525 is a link 548 also connected to the pin 267 normally engaged by the hook 268 of the lever 269. Counter-clockwise movement of the lever 525 (Fig. 24A) moves the link 548 to the right, thereby disengaging the pin 267 from the lever 269 and rocking the link 266 counter-clockwise about the stud 262. It will be remembered that the lever 269 is actuated by the cam disk 273 during adding operations to move the link 266 downwardly and rock all of the levers 258 to actuate the pins 274 to select the totalizers which are to be meshed with the differential actuators. By disconnecting the link 266 from the lever 269 the driving connection between the cam disk 273 and the levers 258 is broken.

Since the condition set up by the total lever 152, as just described, has crippled the automatic means for selecting which of the totalizer lines are to be meshed with the differential actautors, means are provided for setting up a condition by the total lever itself for determining which of said lines is to be meshed with the differential actuators. The total lever plate 185 has three irregularly shaped slots 275 (Fig. 24A), each slot receiving one of the pins 274 on the levers 263. These slots are so shaped that when the total lever 152 is moved downwardly to any of its total or reset positions, the pins 274 are moved alternately away from the rod 187, only one of said pins being moved to operating position at a time. Since the levers 258 are held stationary after being rocked clockwise by the total lever, the movement of the pins 274 causes a clockwise movement of the levers 258 around the stud 262 and by the connection of said levers and the links 244 said links are moved outwardly. This movement of the links 244 positions the pins 276 within the hooks 277 of the spider 278 so that when said spider is rocked clockwise, as previously described, the links 244 rock the totalizer lines associated therewith into mesh with the differential actuators. Each of the slots 275 has a different shape so that the pins 274 are moved alternately whereby their associated pins 276 are moved alternately into engagement with the hooks 277. In other words, only one of the pins 276 can be engaged with its hook 277 at one time during totalizing operations.

This same condition is true when the total lever 152 is moved upwardly to its sub-total or reading positions, as the slots 275 have the same shapes on each side of the position where the pins 274 normally engage said slots.

In totalizing operations the link 286 is moved to a different position from that shown in Fig. 24B. This is done by the total lever 152 preliminary to an operation of the cam shaft 62, so that the time of the engaging and disengaging of the totalizers may be changed in accordance with the desired operation. When the total lever 152 is moved counter-clockwise (Fig. 24A) for a totalizing operation, a slot 550 therein, through its engagement with a pin 551 on a lever 552 (Fig. 24B) pivoted on a stud 553 on the plate 260, rocks said lever 552 clockwise. At the same time the lever 525 is rocked counter-clockwise by the slot 527. Pivoted at 555 to the arm 520 is a link 556 which carries a stud 557 extending in a slot 558 in the lever 552, and in the upper straight portion of a slot 559 in a lever 560 pivoted on the stud 553.

Clockwise movement of the lever 552, as above described, through the stud 557 rocks the lever 560 clockwise about the stud 553, and through the engagement of a pin 561 with a slot 562 in the link 286 rocks said link counter-clockwise about the stud 287 and disengages said link from the stud 284 on the spider 278.

The lever 560 has a slot 563 engaging a pin 564 on a lever 565 pivoted on a stud 566 on the plate 260. The lever 565 carries a pin 567. Clockwise movement of the lever 560 through the engagement of its slot 563 with the pin 564 rocks the lever 565 counter-clockwise, whereby the pin 567 engages a notch 568 in the spider 278 and positively locks said spider in this position until one of the pins 276 has been engaged with its associated hook 277 on said spider. Downward movement of the total lever 152 also rocks the shaft 510 clockwise (Fig. 24B), as previously described, thereby lowering the link 556 so that the stud 557 is moved downwardly a short distance but not far enough to engage the cam portion of the slot 559.

Movement of the total lever 152 downwardly also connects the disk 517 (Fig. 7) with the gear 66 and moves the link 130 to such a position that the gear 66 is allowed to make one complete rotation, thereby giving two rotations to the gear 68 and shaft 62.

After the parts have been moved to the position just described by the movement of the total lever 152 the motor is released to give the shaft 62 two complete rotations in a clockwise direction (Fig. 24B).

During the first rotation of the shaft 62 the lever 288 is rocked clockwise and moves the link 286 to the right and positions a notch 570 therein directly above a pin 571 on the spider 278. Immediately after this has taken place the cam race 505 (Fig. 7) moves the link 506 to the left and rocks the shaft 510 still further in a clockwise direction. This movement of the shaft 510 moves the link 556 downwardly, whereby the stud 557 through its engagement with the cam portion of the slot 559 rocks the lever 560 still further clockwise, and through the engagement of its pin 561 with the slot 562 rocks the link 286 still further counter-clockwise about the stud 287 and engages the notch 570 with the pin 571 on the spider 278. The clockwise movement of the lever 560 just described, also, through the engagement of its slot 563 with the pin 564, rocks the lever 565 clockwise and disengages the pin 567 from the notch 568. After the notch 570 is engaged with the pin 571, and, during the last part of the first rotation of the shaft 62, the lever 288 is rocked counter-clockwise and moves the link 286 to the left, thereby rotating the spider 278 clockwise. This movement of the spider through the engagement of one of its hooks with one of the pins 274 rocks the selected totalizer shaft, as determined by the position of the total lever 152, into engagement with the totalizer actuators previously described. The totalizer is held in engagement with the actuator by the cams 292 and 293 until the actuators have been differentially positioned under the control of the long tooth of its corresponding pinion, after which the lever 288 is rocked clockwise and moves the link 286 to the right, which rocks the spider 278 counter-clockwise, thereby disengaging the selected totalizer from the actuator. Immediately after link 286 has been moved to the right the cam race 505 (Fig. 7) rocks the shaft 510 and arm 520 counter-clockwise and raises the link 556 which rocks the lever 560 counter-clockwise, thereby rocking the link 286 clockwise about the stud 287. This movement of the link 287 disengages its notch 570 from the pin 571. After said disengagement the lever 288 is rocked counterclockwise and moves the link 286 to the left to the position in which it was placed by the movement of the total lever 152.

After the link 286 is moved to the left, as last described, the total lever 152 is moved clockwise to its adding position, which rocks the lever 552 counter-clockwise and raises the link 556 and rocks the arm 520 and shaft 510 counter-clockwise to normal position. The upward movement of the link 556 rocks the lever 560 counter-clockwise to normal position and rocks the link 286 clockwise about the stud 287 so that the notch 285 again engages the pin 284 on the spider 278.

From the above described operation it can be clearly seen that the totalizer line selected by the total lever is rocked into engagement with the totalizer actuators before said actuators are moved differentially, and held in engagement therewith until the differential movement of the actuators, under the control of the long teeth of the pinions 201, is completed, after which said totalizer is rocked out of engagement with the differential actuators, thereby leaving the totalizer at zero.

The control of the engaging and disengaging of the totalizers with the actuators during sub-totalizing operations will now be described. For a sub-total operation the total lever 152 is moved in a clockwise direction (Fig. 24A). This movement of the total lever does not rock the lever 552 or the lever 560, as is the case in totalizing operations, because the slot 550 is concentric with the center of the rod 187 for all positions of the total lever 152 above its adding position. However, clockwise movement of the total lever 152 through the engagement of the pin 526 with slot 527 rocks the lever 525 counter-clockwise in identically the same manner as said lever is rocked during totalizing operations, as above described. This movement of the lever 525 also rocks the shaft 510 clockwise, as above described, to connect the disk 517 (Fig. 6) with the gear 66.

In sub-totalizing operations, the gear 66 receives one complete rotation and the gear 68 and shaft 62 receive two complete clockwise rotations in identically the same manner as described in connection with the totalizing operation. As the lever 560 is not moved by the movement of the total lever 152 the link 286 remains in engagement with the pin 284 on the spider 278.

During the first clockwise movement of the lever 288 the link 286 is moved to the right and rocks the spider 278 clockwise and engages the selected totalizer with the differential actuator. After the totalizer has been engaged the cam race 505 (Fig. 7) moves the link 506 still further to the left, thereby rocking the shaft 510 and arm 520 clockwise, which lowers the link 556, whereupon the stud 557 engages the cam portion of the slot 559 and rocks the lever 560 clockwise about the stud 553. Clockwise movement of the lever 560 rocks the link 286 counter-clockwise about the stud 287 and disengages the notch 285 from the pin 284 on the spider 278. This movement of the lever 560 also rocks the lever 565 counter-clockwise and its pin 567 engages a notch 578 in the spider 278, and positively locks said spider in this position, thereby holding the totalizer in engagement with the actuators. Immediately after the disengagement of the link 286 from the pin 284 the lever 288 is rocked counter-clockwise and moves the link 286 to the left. This movement of the said link is idle because it is not engaged with either the pin 284 or the pin 571. The selected totalizer is now engaged with the differential actuators and said actuators are moved differentially under the control of the long teeth on the totalizer pinions thereby resetting said totalizer to zero. As previously described, the amount which is on the totalizer is now printed from both upper and lower sets of type wheels. During the latter part of the second rotation of the shaft 62 the differential actuators are again moved, and due to the fact that the totalizer pinions are engaged therewith the amount that was taken from said pinions is again accumulated thereon. The lever 288 is again rocked clockwise and moves the link 286 to the right and positions the notch 285 therein directly beneath the pin 284 on the spider 278. The race 505 (Fig. 7) at this time moves the link 506 to the right and rocks the shaft 510 counter-clockwise and raises the link 556 which rocks the lever 560 counter-clockwise and thereby rocks the link 286 clockwise about the stud 287 so that it again engages the pin 284. This counter-clockwise movement of the lever 560 rocks the lever 565 clockwise and disengages its pin 567 from the notch 578 to allow the spider 278 to be rocked. The lever 288 is then rocked counter-clockwise to normal position and moves the link 286 to the left thereby rocking the spider 278 counter-clockwise, which disengages the totalizer from the actuators.

The total lever 152 is then moved counter-clockwise (Fig. 24A) to its normal adding position and raises the link 556 to the position shown in Fig. 24B. This movement of the total lever also disconnects the disk 517 (Fig. 7) from the gear 66 so that said disk is not rotated while the total lever 152 is in adding position.

From the above description it can be clearly seen that during a sub-totalizing operation the totalizer is engaged with the actuator and reset to zero by the movement of the actuator but said totalizer is maintained in engagement until the actuators are again moved, which operation puts back on the totalizer the amount which was taken therefrom so that at the end of a sub-totalizing operation the amount on the totalizer is the same as it was before the sub-totalizing operation was made.

*Operation.*—A short description of the operation of the present machine will now be given.

It will be remembered that on every adding operation the amount set up on the keyboard is added into three totalizers—the daily totalizer, the periodical totalizer and the grand totalizer. In the present system the first operation at the beginning of the day's business is to move the total lever 152 upwardly to its third position above normal and then by a succession of operations read the periodical totalizers. This series of operations will print the amount standing on each of the periodical totalizers at the head of its respective column on the record sheet, as shown in Fig. 29. An "X" will be printed beside each of these amounts to indicate that they are sub-totals. The total lever 152 is then returned to its normal position and the day's business is carried on. For instance, a customer wishes to deposit $34.54. This amount is set up on the keyboard and the "Deposit" key in the transaction bank (Fig. 1) is depressed. The machine is released by the depression of the release key 70. The amount $34.54 is accumulated on the daily "Deposit" totalizer, the periodical "Deposit" totalizer and the grand totalizer. These totalizers are selected for operation by the depression of the "Deposit" key. The amount $34.54 is set up on all the groups of type carriers in the upper printer and is printed in the "Deposit" column (Fig. 29) due to the depression of the "Deposit" key. In this manner the various transactions are registered and recorded.

At the close of the day's business it is desired to have the total of each class of transactions. Therefore the total lever is lowered to its second position below normal, in which position the line of totalizers for accumulating the daily totals is selected for operation. The machine is then successively operated, a different transaction key being depressed on each operation. This causes the total of the day's business to be set up and printed at the foot of each column on the record sheet, and the corresponding daily totalizer to be reset to zero.

At the end of any desired period the periodical totalizers may also be reset to zero. The grand totalizer is, of course, not reset except after a considerable period. It may be reset, however, at any time in the same manner as the other totalizers.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of printing units movable to effect an impression, means for setting up amounts on all of said units simultaneously, means for selecting the unit that is to print, and means for actuating said unit to take an impression.

2. In a machine of the class described, the combination of a plurality of normally latched movably mounted printing units, means for setting up amounts on all of said units simultaneously, means for selecting the unit that is to print, and means for releasing said unit to take an impression.

3. In a machine of the class described, the combination of a plurality of normally latched movably mounted printing units, means for setting up amounts on all of said units simultaneously, means for selecting the unit that is to print, means for releasing said unit to take an impression, and means common to all units for positively returning said actuated unit to its normal position.

4. In a machine of the class described, the combination of a plurality of movably mounted printing units, supporting means therefor, an arm on said supporting means, a plurality of groups of manipulative devices for predetermining the amount to be set up on all of said units, means for setting up the amounts predetermined by said manipulative devices, another group of manipulative devices, means whereby the operation of one of said last mentioned group predetermines which of said printing units is to print, and means including notched latches cooperating with the arms on the supporting means for normally maintaining all of said units in their normal positions.

5. In a machine of the class described, the combination of a plurality of separately mounted printing units, supporting means therefor, an arm on said supporting means, a plurality of groups of manipulative devices for predetermining the amount to be set up on all of said units, means for setting up the amounts predetermined by said manipulative devices, another group of manipulative devices, means whereby the operation of one of said last mentioned group predetermines which of said printing units is to print, means including notched latches cooperating with the arms on the supporting means for maintaining all of said units in their normal positions, means for releasing the maintaining means from the units selected to take an impression for operation, means for operating said selected and released unit, and means common to all units for positively restoring the operated unit to normal position.

6. In a machine of the class described, the combination of a plurality of separately mounted printing units, a plurality of banks of depressible keys for predetermining the amount to be set up on all of said units, sliding racks for setting up the amounts predetermined by the depression of said keys, a single bank of depressible keys, and differentially adjustable means including single toothed segments whereby the depression of one of said last mentioned keys causes one of the toothed segments to be set in a position to determine which of said printing units is to print.

7. In a machine of the class described, the combination of a plurality of movably mounted printing units, a plurality of banks of depressible keys for determining the amount to be set up on all of said units, sliding racks for setting up on all printing units the amounts as determined by the depression of keys, a single bank of depressible keys, a plurality of latching devices for maintaining all of said units in their normal positions, and means controlled by said single bank of keys to operate one of the latch devices to release one of the printing units to select said unit for operation so that the amount set up on all units may be printed from said selected unit only.

8. In a machine of the class described, the combination of a plurality of movably mounted printing units, a plurality of banks of depressible keys for determining the amount to be set up on all of said units, sliding racks for setting up on all printing units the amounts as determined by the depression of said keys, a single bank of depressible keys, a plurality of latching devices for maintaining all of said units in their normal positions, and a lever, operated under the control of said single bank of depressible keys, for unlatching one printing unit to print the amount set up on all printing units from said one unit only.

9. In a machine of the class described, the combination of a plurality of movably mounted printing units, a plurality of banks of depressible keys for determining the amount to be set up on all of said units, sliding racks for setting up on all printing units the amounts as determined by the depression of said keys, a single bank of depressible keys, a plurality of latching devices for maintaining all of said units in their normal positions, a lever, operated under the control of said single bank of depressible keys, for unlatching one printing unit to print the amount set up on all printing units from said one unit only, and a plurality of constantly tensioned springs one of which operates said selected unit.

10. In a machine of the class described, the combination of a plurality of movably mounted printing units, a plurality of banks of depressible keys for determining the amount to be set up on all of said units, sliding racks for setting up on all printing units the amounts as determined by the depression of said keys, a single bank of depressible keys, a plurality of latching devices for maintaining all of said units in their normal positions, a lever, operated under the control of said single bank of depressible keys, for unlatching only one printing unit to print the amount previously set up on all printing units, from said one unit, a plurality of constantly tensioned springs one of which operates said selected unit, and a cam and connections cooperating therewith for returning the operated unit to its normal position.

11. In a machine of the class described, the combination of a plurality of movably mounted printing units, means for setting up amounts on all of said units simultaneously, means for selecting which of said units is to print, a platen, and means for causing said selected unit to strike the said platen.

12. In a machine of the class described, the combination of a plurality of printing units, means for setting up amounts on all of said units simultaneously, means for selecting which of said units is to print, a platen roller, means for causing said selected unit to strike the said roller, and means common to all units for returning said operated unit to its normal position.

13. In a machine of the class described, the combination of a printing element, a frame for supporting said element, a pivot for supporting said frame, a shaft from which said pivot depends, and arms for supporting said shaft.

14. In a machine of the class described, the combination of a printing element, a frame for supporting said element, a pivot for supporting said frame, a shaft from which said pivot depends, arms for supporting said shaft, and means for rocking said arms to raise said shaft, frame and printing element.

15. In a machine of the class described, the combination of a plurality of printing units, a frame for each of said units, for carrying the same, a shaft common to all of said frames, a toothed rack engaging all of said printing units, and means for raising said shaft to remove said units from engagement with said rack.

16. In a machine of the class described, the combination of a plurality of printing units, a frame for each of said units for carrying the same, a shaft for supporting all of said frames, a rack normally engaging each of said units, means for disengaging said units from said rack, and means for rotating any desired unit about said shaft to take an impression from said unit.

17. In a machine of the class described, the combination of a printing element, a frame for carrying said element, a shaft for supporting said frame, a toothed rack, normally engaging said element, means for disengaging said element from said rack, and a spring for rotating said element about said shaft in order to take an impression from said element.

18. In a machine of the class described, the combination of a plurality of printing units, a frame for each of said units, a pivotal mounting for each frame, a shaft common to all of said units for supporting said pivotal mountings, a toothed rack for setting up amounts on all of said units, means for lifting said units out of engagement with said rack, and means for giving each of said units a partial rotation on its pivot.

19. In a machine of the class described, the combination of a plurality of printing units, a frame for each of said units, a pivotal mounting for each frame, a shaft common to all of said units for supporting said pivotal mountings, a toothed rack for setting up amounts on all of said units, means for lifting said units from the engagement of said rack, and a second toothed rack for giving each of said units a partial rotation.

20. In a cash register printing mechanism, the combination of a printing unit, a rack for setting said unit, means for removing said unit bodily from engagement with said rack, and means for giving said unit an additional movement in order to bring it to printing position.

21. In a cash register printing mechanism, the combination of a printing unit, a rack for setting said unit, means for lifting said unit out of engagement with said rack, means for giving said unit an additional movement in order to bring it to position to print and means to impel the printing unit against record material to print.

22. In a cash register printing mechanism, the combination of a printing unit, a rack for setting said unit, means for lifting said unit out of engagement with said rack, and means for rotating said unit bodily in order to bring it to position to print.

23. In a machine of the class described, the combination of a plurality of printing units each mounted in a separate frame, a common shaft upon which all frames are pivotally mounted, common means for engaging all of said frames for simultaneously turning them in a direction at right angles to their pivotal axes, means for selecting any one of the units to take an impression therefrom, and means for moving the frame carrying the selected unit about the common shaft to the impression taking position.

24. In a machine of the class described, the combination of a plurality of printing units, a frame carrying each of said units, a vertical axis for said frame, a horizontal pivot for each frame, common means for supporting all of the frames on their horizontal pivots, common means for turning all of the frames simultaneously on their vertical axes, common means normally engaging all of the units for differentially positioning them, means for moving said shaft to disengage all of the units from their actuators, means for selecting any one of the units to take an impression therefrom, and means for turning the selected frame on the common shaft to take the impression.

25. In a machine of the class described, the combination of a plurality of separately mounted groups of type carriers, means for setting all of the groups of type carriers simultaneously, a differential mechanism adapted to be set in a plurality of positions equal in number to the number of groups of type carriers for selecting the group that is to print, a plurality of keys for controlling the setting of the differential mechanism except as to one of its positions, and a total lever for causing said differential mechanism to be set in the said excepted position.

26. In a machine of the class described, the combination of a plurality of separately mounted printing units separately movable to effect printing; means for setting data on all of said units simultaneously; and means for selecting the unit that is to print the data set up.

27. In a cash register printing mechanism; a printing element; means for raising the element; means for rotating said element to present its printing face in a different plane; and an aligner constructed to move into engagement with the printing element as the latter is raised, and to rotate with the printing element when the latter is rotated to hold said element in alignment while the element is setting in its various positions.

28. In a machine of the class described, the combination of a printing element; a pivoted frame supporting said element; means for raising said frame; means for rotating the frame about its vertical axis; means for rotating the frame about its pivot; an aligner supported by said frame and constructed to move into cooperative relation with the printing element by the raising of the frame, and to remain in cooperating relation with the printing element during the rotation of the frame to maintain the printing element in proper alignment while said element is out of normal position.

29. In a cash register printing mechanism, the combination of a printing element; a pivoted frame having an axle to support said element, said frame adapted to be raised bodily, rotated on about its vertical axis, and then swung on its pivot; means for raising the frame; means for rotating the frame about its vertical axis to change the plane of the printing face of the printing element preparatory to effecting an impression; means for rotating the frame about its pivot to take an impression from the printing element; an aligner adapted to cooperate with said element while it is in all of its various positions out of normal, to prevent the element from getting out of printing alignment in one direction; and another aligner adapted to cooperate with said frame to prevent the printing element from getting out of printing alignment in another direction.

30. In a cash register printing mechanism, the combination of printing means carried in a pivoted frame; means for raising the frame; means for rotating the frame about its vertical axis; means for rotating the frame about its pivot to take an impression from the printing means; and means cooperating with the printing means and its pivoted frame to positively maintain the printing means in perfect printing alignment while the printing means is out of its normal position during the several movements of the printing frame.

31. In a machine of the class described, the combination of a plurality of movably mounted printing units, supporting means therefor, an arm on said supporting means, a group of manipulative devices, means whereby the operation of one of said devices predetermines which of the printing units is to print, and means including notched latches cooperating with the arms on the supporting means for normally maintaining all of said units in their normal positions.

32. In a machine of the class described, the combination of a plurality of separately mounted printing units, supporting means therefor, an arm on said supporting means, a group of manipulative devices, means whereby the operation of one of said devices predetermines which of said printing units is to print, means including notched latches cooperating with the arms on the supporting means for maintaining all of said units in their normal positions, means for releasing the maintaining means from the unit selected for operation, means for operating said selected and released unit to take an impression, and means common to all units for positively restoring the operated unit to normal position.

33. In a machine of the class described, the combination of a plurality of separately mounted printing units, a single bank of depressible keys, and differentially adjustable means including single toothed segments whereby the depression of one of said keys causes one of the toothed segments to be set in a position to predetermine which of said printing units is to print.

34. In a machine of the class described, the combination of a plurality of movably mounted printing units, a single bank of depressible keys, a plurality of latching devices for maintaining all of said units in their normal positions, and means controlled by said single bank of keys to operate one of the latch devices to release one of the printing units to select said unit for operation so that the amount set up on all units may be printed from said selected unit only.

35. In a machine of the class described, the combination of a plurality of movably mounted printing units, a single bank of depressible keys, a plurality of latching devices for maintaining all of said units in their normal positions, and a lever, operated under the control of said single bank of depressible keys, for unlatching one printing unit to print the amount set upon all printing units from said one unit only.

36. In a machine of the class described, the combination of a plurality of movably mounted printing units, a single bank of depressible keys, a plurality of latching devices for maintaining all of said units in their normal positions, a lever, operated under the control of said single bank of depressible keys, for unlatching one printing unit to print the amount set up on all printing units from said one unit only, and a plurality of constantly tensioned springs one of which operates said selected unit.

37. In a machine of the class described, the combination of a plurality of movably mounted printing units, a single bank of depressible keys, a plurality of latching devices for maintaining all of said units in their normal positions, a lever, operated under the control of said single bank of depressible keys, for unlatching only one printing unit to print the amount previously set up on all printing units, from said one unit, a plurality of constantly tensioned springs one of which operates said selected unit, and a cam and connections cooperating therewith for returning the operated unit to its normal position.

38. In a machine of the class described, the combination of a plurality of movable and selectable printing units of like character, a plurality of groups of manipulative devices for predetermining the amount to be set up on each of said units, means controlled by the manipulative devices to set up the identical amount on each printing unit, another group of manipulative devices, means controlled by the operation of one of said last mentioned group of manipulative devices to predetermine which of said printing units is to be selected to print.

In testimony whereof I affix my signature.

BERNIS M. SHIPLEY.